United States Patent
Onishi et al.

(10) Patent No.: US 11,709,599 B2
(45) Date of Patent: Jul. 25, 2023

(54) MEMORY CONTROLLER AND MEMORY SYSTEM

(71) Applicant: KIOXIA CORPORATION, Tokyo (JP)

(72) Inventors: Shohei Onishi, Kawasaki Kanagawa (JP); Kenta Yasufuku, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 5 days.

(21) Appl. No.: 17/458,135

(22) Filed: Aug. 26, 2021

(65) Prior Publication Data

US 2022/0308766 A1 Sep. 29, 2022

(30) Foreign Application Priority Data

Mar. 23, 2021 (JP) ................. 2021-048877

(51) Int. Cl.
*G06F 3/06* (2006.01)
(52) U.S. Cl.
CPC .......... *G06F 3/0616* (2013.01); *G06F 3/0655* (2013.01); *G06F 3/0679* (2013.01)
(58) Field of Classification Search
CPC ..... G06F 3/0616; G06F 3/0655; G06F 3/0679
See application file for complete search history.

(56) References Cited

U.S. PATENT DOCUMENTS

| | | | |
|---|---|---|---|
| 8,495,284 B2 | 7/2013 | Iyer et al. | |
| 8,943,263 B2 * | 1/2015 | Frost | G06F 3/0679 711/170 |
| 9,710,176 B1 * | 7/2017 | Tang | G06F 12/0246 |
| 10,606,517 B2 | 3/2020 | Shirota et al. | |
| 2010/0023675 A1 * | 1/2010 | Chen | G06F 12/0246 711/E12.008 |
| 2013/0326148 A1 * | 12/2013 | Fang | G06F 12/0246 711/E12.07 |
| 2014/0379960 A1 * | 12/2014 | Linkewitsch | G06F 3/065 711/103 |
| 2019/0347012 A1 | 11/2019 | Monteleone et al. | |
| 2020/0159619 A1 * | 5/2020 | Oh | G11C 13/0035 |
| 2021/0165576 A1 * | 6/2021 | Koch | G06F 3/0644 |
| 2021/0263852 A1 * | 8/2021 | Seok | G06F 12/0891 |
| 2022/0075717 A1 * | 3/2022 | Gunnam | G06F 12/0246 |

FOREIGN PATENT DOCUMENTS

JP 2019-164508 A 9/2019

* cited by examiner

*Primary Examiner* — Nanci N Wong
(74) *Attorney, Agent, or Firm* — Kim & Stewart LLP

(57) ABSTRACT

A memory controller connectable to a semiconductor memory including a plurality of memory areas, includes a counter circuit configured to count a degree of wear of each of the memory areas in response to a memory operation addressed thereto, and a control circuit configured to set a rate of for wear leveling to be performed on the plurality of memory areas based on a total number of memory operations performed thereon, and select whether to perform wear leveling on each of the memory areas based on the rate, the degree of wear counted for the memory area, a first threshold for the degree of wear, and a second threshold for the degree of wear. The second threshold is greater than the first threshold.

17 Claims, 15 Drawing Sheets

BEFORE WEAR LEVELING (ONE PAGE) ⇒ AFTER WEAR LEVELING (ONE PAGE)

BEFORE WEAR LEVELING (ONE PAGE) ⇒ AFTER WEAR LEVELING (ONE PAGE)

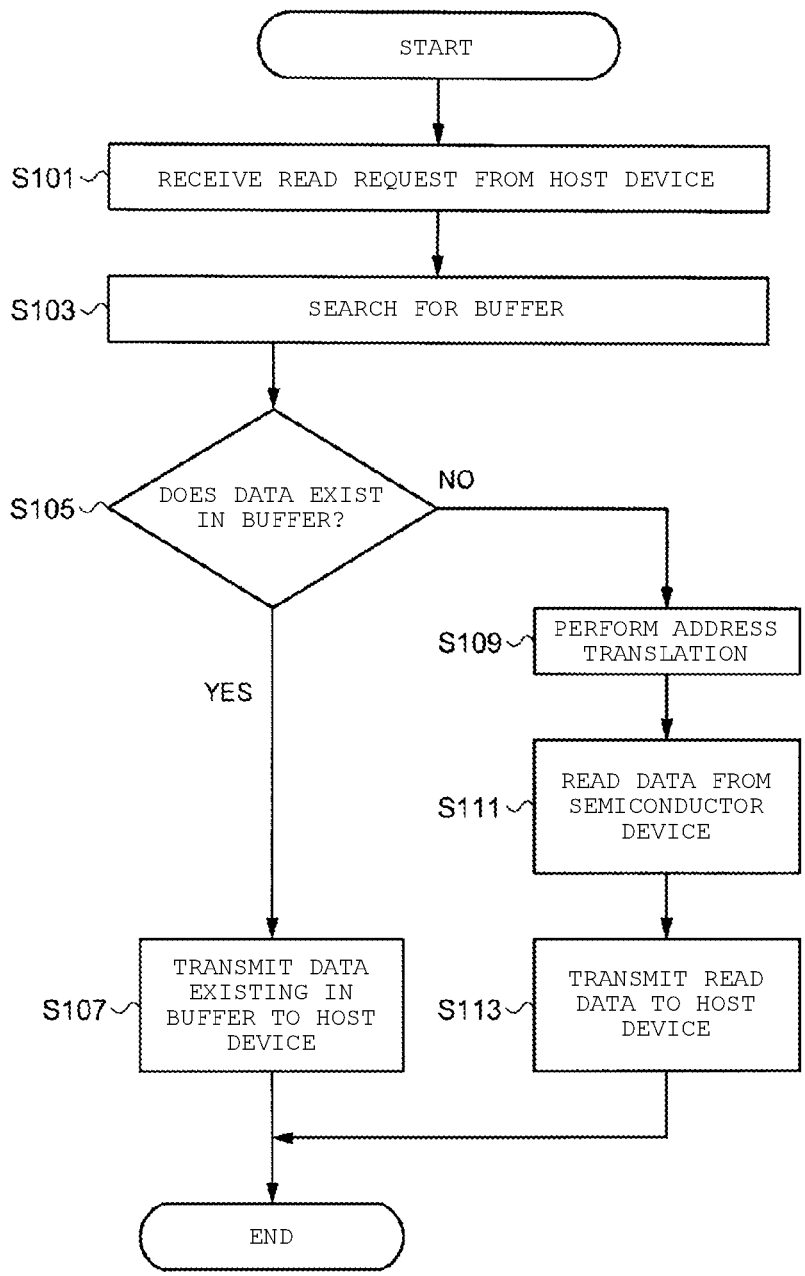

MEMORY CONTROLLER AND MEMORY SYSTEM

CROSS-REFERENCE TO RELATED APPLICATION

This application is based upon and claims the benefit of priority from Japanese Patent Application No. 2021-048877, filed Mar. 23, 2021, the entire contents of which are incorporated herein by reference.

FIELD

Embodiments described herein generally relate to a memory controller and a memory system incorporating a memory controller.

BACKGROUND

A memory system may include a non-volatile memory and a memory controller that controls the non-volatile memory. If the memory controller repeatedly writes, reads, and erases data on the non-volatile memory, the non-volatile memory may eventually become deteriorated. As the non-volatile memory is worn out, the non-volatile memory may be damaged and data stored in the non-volatile memory may not be readable. In view of this, the memory controller performs "wear leveling" on the non-volatile memory to reduce the possibility that the data stored in the non-volatile memory may become unreadable. In this context, wear leveling is an operation of replacing data stored at a page location in the non-volatile memory for which the number of data write operations is large with a page location for which the number of data write operations is less. Thereafter, an address translation table is updated accordingly. With wear leveling operations, it is possible to prevent data write operations from being concentrated on specific memory cells or page locations in the non-volatile memory, and the data write operations are leveled across the memory cells (or page locations) in the non-volatile memory. As a result, the memory system will generally have a longer life.

BRIEF DESCRIPTION OF THE DRAWINGS

FIG. 9 is a flowchart of a read operation in a memory system according to a first embodiment.

DETAILED DESCRIPTION

Figure 1:
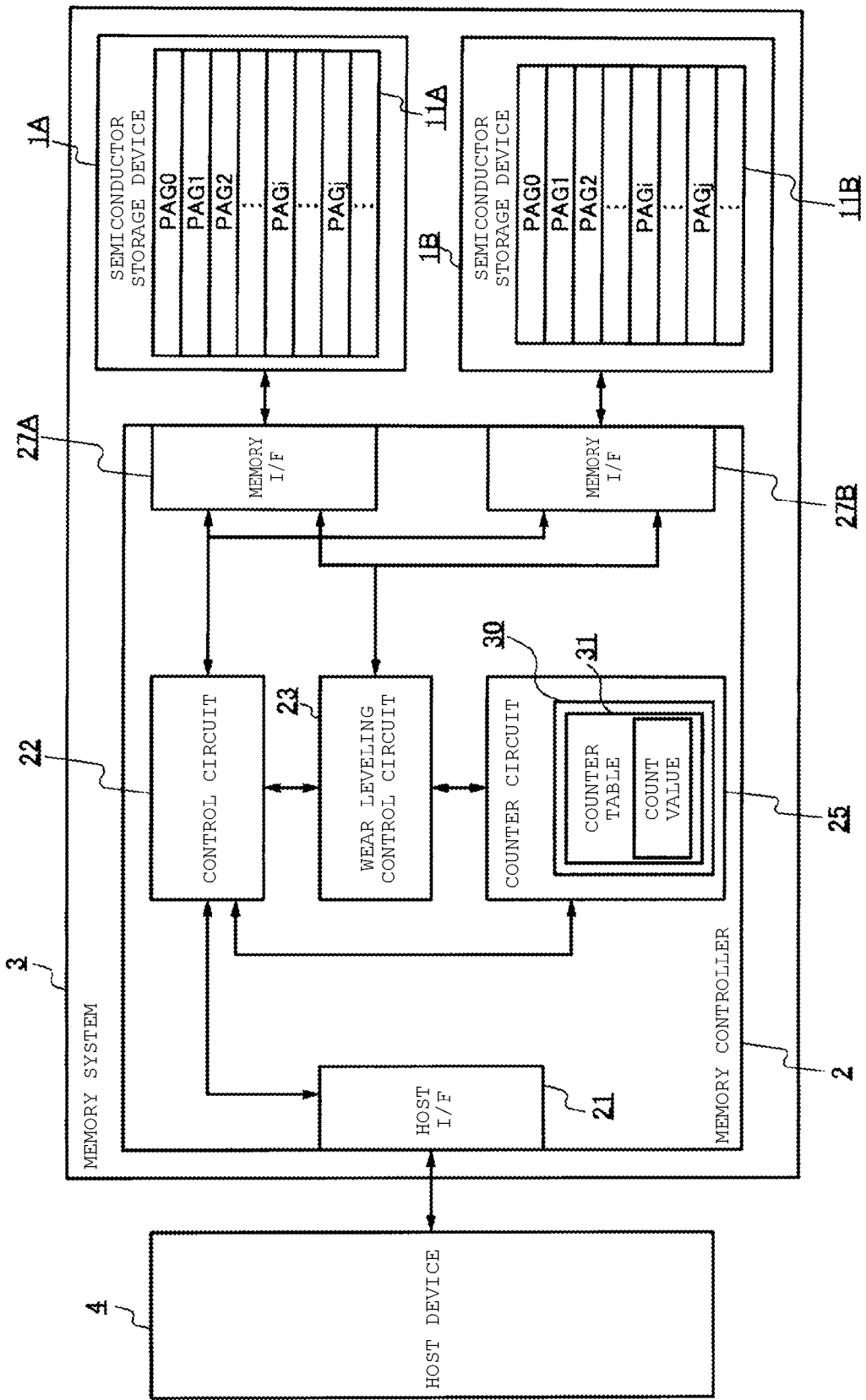
FIG. 1 is a block diagram of a memory system including a semiconductor storage device and a memory controller according to a first embodiment.

Embodiments provide a memory controller that can prevent performance deterioration associated with wear leveling being performed on a non-volatile memory.

In general, according to one embodiment, a memory controller is connectable to a semiconductor memory including a plurality of memory areas and includes a counter circuit configured to count and update a degree of wear of each of the memory areas in response to a memory operation addressed thereto. The memory controller further includes a control circuit configured to set a rate for wear leveling to be performed on the plurality of memory areas based on a total number of write operations performed thereon, and select whether to perform wear leveling on each of the memory areas based on the set rate, the degree of wear counted for the memory area, a first threshold for the degree of wear, and a second threshold for the degree of wear. The second threshold is greater than the first threshold.

Hereinafter, certain example embodiments will be described with reference to the drawings. In the following description, the same reference numerals will be assigned to those elements having the same functions and configurations. When multiple elements sharing a common reference numeral are required to be distinguished from each other for purpose of descript, subscripts may be added to the common reference numeral to distinguish these elements from each other. If the elements sharing same reference numeral do not need to be particularly distinguished from each other in description, then just the shared reference numeral will be used for these elements and the subscripts will be omitted.

First Embodiment

1. Configuration Example 1-1. Configuration of Memory System 3

FIG. 1 is a block diagram showing an example of a semiconductor storage device 1 and a memory system 3 which includes the semiconductor storage device 1. The configuration of the memory system 3 according to the first embodiment is not limited to the configuration shown in FIG. 1.

As shown in FIG. 1, the memory system 3 includes the semiconductor storage device 1 and a memory controller 2.

The memory system 3 is connected to a host device 4. The memory system 3 is, in general, controlled by the host device 4. The memory system 3 may incorporate the host device 4 or be incorporated within the host device 4. For example, the memory system 3 can be a Dual-Inline Memory Module (DIMM), a CXL module, a Solid-State Drive (SSD), and an SD™ card.

The host device 4 has one or more processors. For example, the processor is a Central Processing Unit (CPU). The processor may include one or more CPU cores. In accordance with a software program or the like, the host device 4 transmits a write request (hereinafter referred to as "host write request") or a read request (hereinafter referred to as "host read request") to the memory controller 2.

The memory controller 2 can be connected to the host device 4 and the semiconductor storage device 1. The memory controller 2 can receive signals including either a host write request or a host read request from the host device 4. Based on the request, the memory controller 2 controls data write operations or data read operations on the semiconductor storage device 1 and data is written to, and read from, the semiconductor storage device 1 accordingly.

For example, the semiconductor storage device 1 is connected to the memory controller 2, and is controlled by the memory controller 2. The semiconductor storage device 1 receives a signal including a request according to a predetermined protocol from the memory controller 2, and performs the requested operation. The requested operation can be performed on the semiconductor storage device 1 and is, for example, a data write operation, a wear leveling operation, or a data read operation. When semiconductor storage device 1 receives a signal for a data write operation from the memory controller 2, the semiconductor storage device 1 writes (stores) data in a memory cell array 11. If the semiconductor storage device 1 receives a signal for a data read operation from the memory controller 2, and the semiconductor storage device 1 reads data from the memory cell array 11.

For example, the semiconductor storage device 1 is a non-volatile memory. For example, the non-volatile memory can be a Phase Change Random Access Memory (PRAM), a Phase Change Memory (PCM), a Resistive Random Access Memory (ReRAM), or a Magnetoresistive Random Access Memory (MRAM). For example, a non-volatile memory element may be a phase change memory element, a resistive random access memory element, or a magnetoresistive random access memory element. The phase change memory, the resistive random access memory, or the magnetoresistive random access memory are also sometimes referred to as Storage Class Memory.

1-2. Configuration of Semiconductor Storage Device 1

As shown in FIG. 1, the semiconductor storage device 1 has the memory cell array 11. The memory cell array 11 has a plurality of pages PAG (PAG0, PAG1, PAG2 . . . PAGi . . . PAGj . . . ). Here, a numerical value i is a positive integer, and j is a positive integer greater than i. The page PAG includes a plurality of non-volatile memory cells associated with bit lines and word lines. For example, the page PAG is one unit (one operation unit) of the data write operation and the data read operation. That is, each page PAG corresponds to the minimum unit size for a data read or write operation. The data write operations and the data read operations are performed on a per page PAG basis. For example, when each of the memory cells in a page PAG stores one bit of data, then data included in one page PAG is referred to as "one page of data" or "a page of data". One page PAG may be formed by memory cells and store 256 bytes of data, for example. One page may be formed across a plurality of memory cell arrays 11.

As shown in FIG. 1, the memory system 3 has, for example, two semiconductor storage devices 1. The two semiconductor storage devices 1 include a semiconductor storage device 1A having a memory cell array 11A and a semiconductor storage device 1B having a memory cell array 11B. A configuration or a function of the semiconductor storage device 1 in the memory system 3 is not limited to the example shown in FIG. 1. For example, the number of semiconductor storage devices 1 in the memory system 3 may be three or more. In addition, storage capacity of the semiconductor storage device 1A may be the same as or may be different from storage capacity of the semiconductor storage device 1B. The basic configuration or functions of the semiconductor storage device 1 in the memory system 3 may be varied from those of this specific example without departing from the scope of the present disclosure.

1-3. Configuration of Memory Controller 2

As shown in FIG. 1, for example, the memory controller 2 includes a host interface circuit 21 (hereinafter referred to as "host I/F"), a control circuit 22, a wear leveling control circuit 23, a counter circuit 25, a memory interface circuit 27A (hereinafter referred to as "memory I/F"), and a memory I/F 27B.

In the following description, in some cases, a single page PAG in the semiconductor storage device 1 may be referred to as a device area on which the wear leveling is performed. That is, one page PAG may be considered as a minimum unit size or unit size on which the wear leveling is performed. However, the unit size for wear leveling operations may be a plurality of pages PAG in some instances. In the following example the minimum unit size is set to one page PAG.

The host I/F 21 is connected to the host device 4 and the control circuit 22. For example, the host I/F 21 is connected to the host device 4 via a bus provided between the host device 4 and the host I/F 21, and is connected to the control circuit 22 via a bus provided between the host I/F 21 and the control circuit 22. Requests or signals required for operating the semiconductor storage device 1A and the semiconductor storage device 1B are transmitted from the host device 4 to the control circuit 22 via the bus and the host I/F 21.

For example, the control circuit 22 is connected to the host I/F 21, the wear leveling control circuit 23, the memory I/F 27A, and the memory I/F 27B. For example, the control circuit 22 is connected to each circuit and the I/F via a bus. The control circuit 22 controls the semiconductor storage device 1A and the semiconductor storage device 1B based on a signal including a request received from the host device 4 and required for operating the semiconductor storage device 1A and the semiconductor storage device 1B.

For example, the control circuit 22 receives a signal including a host write request according to the data write operation on the semiconductor storage device 1A or the semiconductor storage device 1B from the host device 4, and writes the data on the semiconductor storage device 1A or the semiconductor storage device 1B. For example, the control circuit 22 receives from the host device 4 a host read request according to the data read operation from the semiconductor storage device 1A or the semiconductor storage device 1B, and reads the data from the semiconductor storage device 1A or the semiconductor storage device 1B. In addition, the control circuit 22 performs address translation in the data write operation and the data read operation.

Data (write data) to be written on the semiconductor storage device 1A or the semiconductor storage device 1B may temporarily be stored in a memory 32 (FIG. 4) provided in the memory controller 2, and may be written on the semiconductor storage device 1A or the semiconductor storage device 1B from the memory 32. The data (write data) to be written on the semiconductor storage device 1A or the semiconductor storage device 1B may temporarily be stored in a write buffer in the memory controller 2, and may be written on the semiconductor storage device 1A or the semiconductor storage device 1B from the write buffer. Read data from the semiconductor storage device 1A or the semiconductor storage device 1B may temporarily be stored in the memory 32 provided in the memory controller 2, and may be transferred from the memory 32 to the host device 4. The read data from the semiconductor storage device 1A or the semiconductor storage device 1B may temporarily be stored in a read buffer in the memory controller 2, and may be transferred from the read buffer to the host device 4. The write buffer or the read buffer may be simply referred to as a buffer in some cases.

For example, the counter circuit 25 is connected to the control circuit 22 and the wear leveling control circuit 23. The counter circuit 25 counts the number of the write operations each time the wear leveling is performed in the semiconductor storage device 1A and the semiconductor storage device 1B, and updates the number of the write operations. For example, when the wear leveling is performed in the semiconductor storage device 1A and the semiconductor storage device 1B, the counter circuit 25 increments the number of the write operations n. Here, the numerical value n is an integer of 0 or more. In addition, each time the data write operation is performed on the page PAG in the semiconductor storage device 1A and the semiconductor storage device 1B, the counter circuit 25 may count the number of the write operations, and may update the number of the write operations of the page PAG. For example, when the data write operation is performed on the page PAG2 of the semiconductor storage device 1B, the counter circuit 25 increments the number of the write operations. In addition, each time the data read operation is performed on the page PAG in the semiconductor storage device 1A and the semiconductor storage device 1B, the counter circuit 25 may count the number of the read operations, and may update the number of the read operations. The number of the write operations and the number of the read operations are managed for each page PAG by using a counter table 31.

For example, there is a possibility that the semiconductor storage device 1A and the semiconductor storage device 1B may be exhausted or deteriorated depending on the number of the write operations and/or the number of the read operations. Therefore, the number of the write operations and/or the number of the read operations may be used as information indicating a degree of wear (hereinafter referred to as "wear information") of the semiconductor storage device 1A and the semiconductor storage device 1B. The degree of wear may be determined in a different way. For example, the degree of wear may be determined by counting one read operation as a predetermined number (e.g., 1) and counting one write operation as a greater number (e.g., 100). The degree of wear may be determined according to the total number of read operations and/or write operations using different weights, and the degree is not necessarily identical to the actual number of such memory operations. In the first embodiment, the counter circuit 25 may be referred to as a wear counter, and the number of the write operations and the number of the read operations may be referred to as a counter value, a count value, or the wear information.

For example, the counter circuit 25 includes a storage device 30 that stores the counter table 31. For example, the storage device 30 is a memory such as a Random Access Memory (RAM). The counter table 31 may be stored in the semiconductor storage device 1A or the semiconductor storage device 1B. For example, the counter table 31 is a table which associates each of the plurality of pages PAG with the count value of the write operation on the predetermined page PAG. That is, the page PAG and the count value for the page PAG may have a one-to-one correspondence.

For example, the wear leveling control circuit 23 is connected to the control circuit 22, the counter circuit 25, the memory I/F 27A, and the memory I/F 27B. For example, the wear leveling control circuit 23 acquires a count value stored in the counter table 31 to perform the wear leveling from the counter circuit 25, and acquires a threshold stored in a setting information table 34 (see FIG. 4) and statistical information stored in a statistical information table 33 (see FIG. 4) from the memory 32. The wear leveling control circuit 23 determines whether or not to perform the wear leveling on the semiconductor storage device 1A and the semiconductor storage device 1B based on the count value, the threshold, and the statistical information. When a condition for performing the wear leveling is satisfied, the wear leveling control circuit 23 performs the wear leveling on the semiconductor storage device 1A or the semiconductor storage device 1B.

For example, the wear leveling control circuit 23 may perform the wear leveling depending on the counted number of the write operations or the counted number of the read operations. In such a case, the wear leveling control circuit 23 may select a page PAG having a small number of the write operations so that the data is more evenly written on all of pages PAG in the semiconductor storage device 1A and the semiconductor storage device 1B.

The memory controller 2 includes the memory 32 that stores the setting information table 34, an address translation table 35, and the statistical information table 33. For example, the memory 32 is a RAM or a cache memory, which is a high-speed small-capacity memory. The setting information table 34, the address translation table 35, and the statistical information table 33 may be stored in the semiconductor storage device 1A or the semiconductor storage device 1B.

The setting information table 34 is a table that stores setting information. For example, the setting information provides a condition or a restriction to be used in determining whether to perform the wear leveling. The setting information may be set in advance and/or may be dynamically updated based on predetermined operations or conditions.

In the first embodiment, the condition or restriction set in advance for determining whether to perform the wear leveling is a threshold value for the total number of write operations. In the first embodiment, the setting information includes a cycle on which the wear leveling is to be performed (a wear leveling cycle), a first threshold, and a second threshold that is greater than the first threshold.

For example, the first threshold and the second threshold are the thresholds on the number of the write operations. The first and second threshold are provided to be used by the wear leveling control circuit 23 to determine whether to perform the next (subsequent) wear leveling on a certain unit size for the semiconductor storage device 1.

For example, with regard to each page PAG in which the control circuit 22 performs a predetermined operation, the address translation table 35 stores a correspondence (referred to as mapping information) between a logical address specified by the host device 4 and a corresponding page number (physical address) in the semiconductor storage device 1A or the semiconductor storage device 1B. Each of host write request and host read request from the host device 4 includes the logical address of the data to be written and the data to be read. The control circuit 22 translates the logical address to the physical address by reference to the address translation table 35. In this manner, the control circuit 22 accesses a particular storage area in the semiconductor storage device 1A or the semiconductor storage device 1B to be written and to be read. When the unit size for the performing of the wear leveling and the unit size for the address translation are different from the page PAG, an identifier assigned to each unit is the physical address corresponding to the logical address.

The statistical information table 33 stores, for example, the statistical information such as information related to an operation rate of the wear leveling, an operation rate of the semiconductor storage device 1, and information required for setting the probability of performing the next wear leveling.

The memory I/F 27 is connected to the control circuit 22 and the wear leveling control circuit 23. For example, the memory I/F 27 is connected to each circuit and I/F via a bus. The memory I/F 27 receives a signal including a request required for operating the semiconductor storage device 1A and the semiconductor storage device 1B, and write data from the control circuit 22 and the wear leveling control circuit 23, and transmits the signal and the write data to the semiconductor storage device 1A and the semiconductor storage device 1B. In addition, the memory I/F 27 receives from the semiconductor storage device 1A and the semiconductor storage device 1B, read data transmitted from the semiconductor storage device 1A or the semiconductor storage device 1B and transmits the read data to the control circuit 22 and the wear leveling control circuit 23.

As shown in FIG. 1, the memory system 3 has a semiconductor storage device 1A and a semiconductor storage device 1B. The memory system 3 has a memory I/F 27A connected to the semiconductor storage device 1A and a memory I/F 27B connected to the semiconductor storage device 1B.

A configuration or a function of the memory I/F 27 in the memory system 3 is not limited to the example shown in FIG. 1. For example, when the number of the semiconductor storage devices 1 in the memory system 3 is three, the memory system 3 has a memory I/F 27 connected to each of the semiconductor storage device 1. That is, the memory system 3 has three memory I/Fs 27.

2. Operation Example

Figure 2:
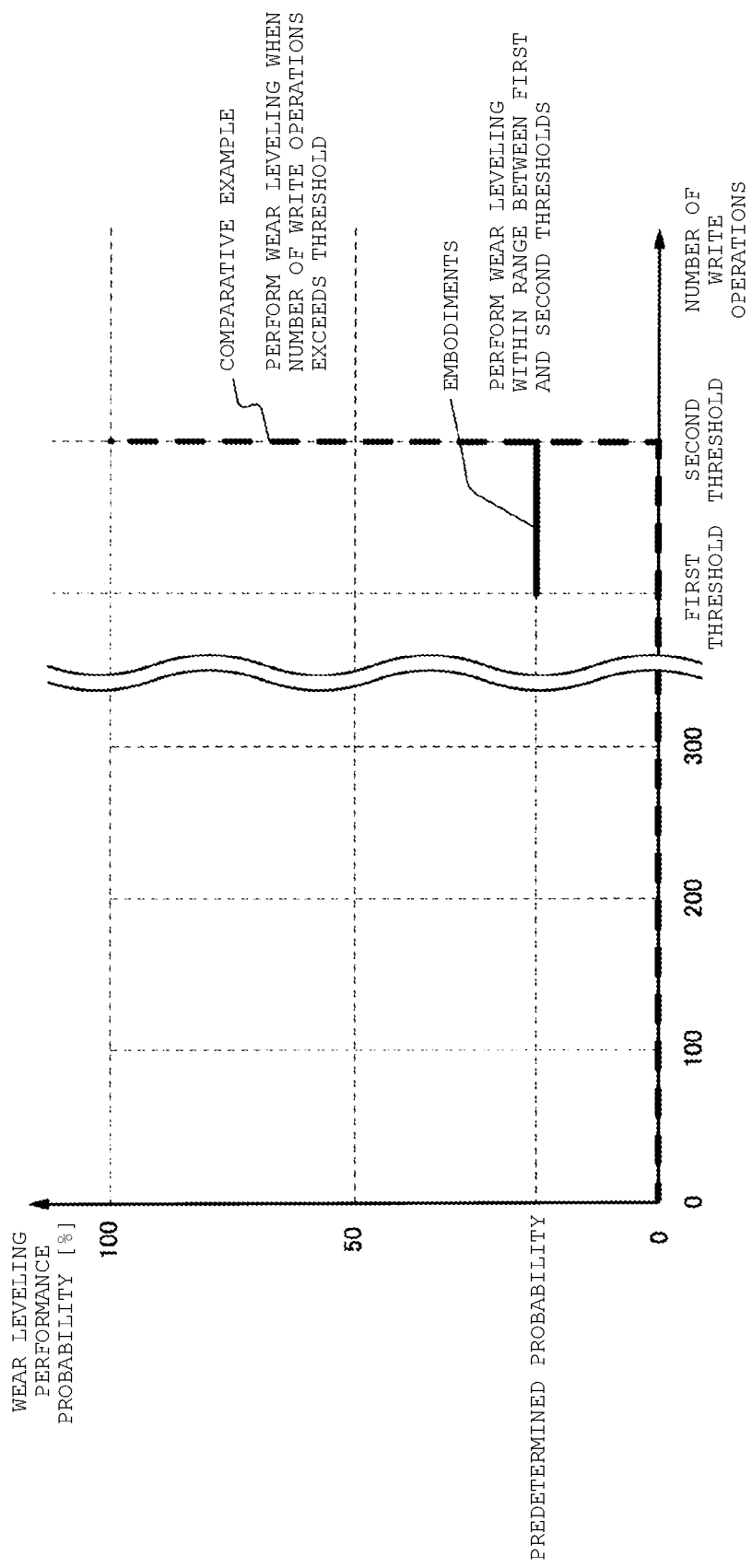
FIG. 2 depicts a graph related to a relationship between the number of operations and a wear leveling performance probability in a memory system according to a first embodiment and in a memory system according to a comparative example.

An example of an operation of the memory system 3 according to the first embodiment will be described.
2-1. Example of Wear Leveling With reference to FIG. 2, wear leveling in the memory system 3 according to the first embodiment and a memory system according to a comparative example will be described. In FIG. 2, the solid line on the graph shows a relationship between the number of write operations (the count value after a previous wear leveling has been performed) and the wear leveling performance probability (the probability the next wear leveling operation will be performed) for a predetermined unit size according to the first embodiment. The broken line on the graph shows the relationship between the number of write operations (the count value after the previous wear leveling has been performed) and the wear leveling performance probability for the predetermined unit size according to the comparative example. The relationship for the memory system 3 according to the first embodiment and the memory system according to the comparative example is not limited to the example shown in FIG. 2.

As shown in FIG. 2, in the memory system 3 according to the first embodiment, in order to determine whether the wear leveling control circuit 23 performs the next wear leveling in a certain unit, two different thresholds (referred to as first and second thresholds) are provided in advance for the number of the write operations.

In the memory system 3 according to the first embodiment, when the data write operation is performed on the certain unit, the wear leveling control circuit 23 determines whether to perform the wear leveling on the same unit when the number of the write operations for the unit exceeds the first threshold and until the number reaches the second threshold.

For example, in FIG. 2, in the memory system 3 according to the first embodiment, the wear leveling control circuit 23 determines whether or not to perform the wear leveling only when the number of previous write operations is between 900 and 1,000 (that is, in a range of 901 to 1,000) for the unit. The wear leveling control circuit 23 can shift or delay the timing for performing the wear leveling for each unit of the semiconductor storage device 1. In the first embodiment, the first threshold is 900 operations (write operations), and the second threshold is 1,000 operations (write operations). In addition, in the first embodiment, the probability of performing the next wear leveling (wear leveling performance probability) on the certain unit of the semiconductor storage device 1 when the number of previous operations is between the first threshold and the second threshold is a predetermined probability or fixed probability. The predetermined probability is 20%, for example.

In FIG. 2, in the memory system 3 according to the first embodiment, when a data write operation is to be performed on the certain unit of the semiconductor storage device 1, the wear leveling control circuit 23 determines whether or not to perform the wear leveling when the number of previous write operations on the unit since the previous wear leveling on the unit is more than 900 but equal to or less than 1,000. The wear leveling control circuit 23 thus determines whether or not to perform the wear leveling according to the different numbers of the previous write operations. In this example, the wear leveling control circuit 23 decides to perform the wear leveling with the fixed probability of 20% when the number of the previous write operations since the last wear leveling on the unit is more than 900 but equal to or less than 1,000.

As shown in FIG. 2, in the memory system according to the comparative example, when a data write operation is performed on a certain unit of the semiconductor storage device, the memory system performs the wear leveling on the certain unit of the semiconductor storage device whenever the number of the write operations since the previous wear leveling on the unit exceeds 1,000. That is, the memory system performs the wear leveling on the unit as soon as the number of the write operations on the unit exceeds 1,000.

For example, a host device performs a sequential write operation, which means that the host device performs the write operation on a certain area (or a certain address range) of the semiconductor storage devices in order from the beginning of an address range. For example, when the host device repeatedly performs the sequential write operation on a semiconductor storage device, the host device can evenly perform the write operations across a plurality of pages in a target area of the semiconductor storage device. In such as case, as shown in FIG. 2, in the memory system according to the comparative example, when the host device performs the sequential write operation on the semiconductor storage devices, the number of the write operations performed on units of the plurality of semiconductor storage devices reaches 1,000 at the same time. As a result, the wear leveling will be performed all at once for the plurality of semiconductor storage devices. Accordingly, the memory system according to the comparative example more frequently reads pages in the semiconductor storage device associated with the wear leveling, and more frequently writes pages in the semiconductor storage device, and thus, performance of the memory system may deteriorate.

On the other hand, in the memory system 3 according to the first embodiment, the wear leveling control circuit 23 determines whether to perform the wear leveling on a certain unit of each semiconductor storage device 1 using two thresholds, and is thus likely to perform the wear leveling on the semiconductor storage devices 1A and 1B at different times. As a result, the wear leveling control circuit 23 can spread the timing for performing the wear leveling between the two thresholds for each unit of the semiconductor storage devices 1A and 1B. Therefore, the memory system 3 according to the first embodiment can reduce a possibility that the timing to perform the write operation on each unit of the semiconductor storage device 1 associated with the wear leveling may be concentrated at a particular period of time, and can thus prevent performance deterioration of the memory system.

2-2. Example of Data Write Operation

Figure 3:
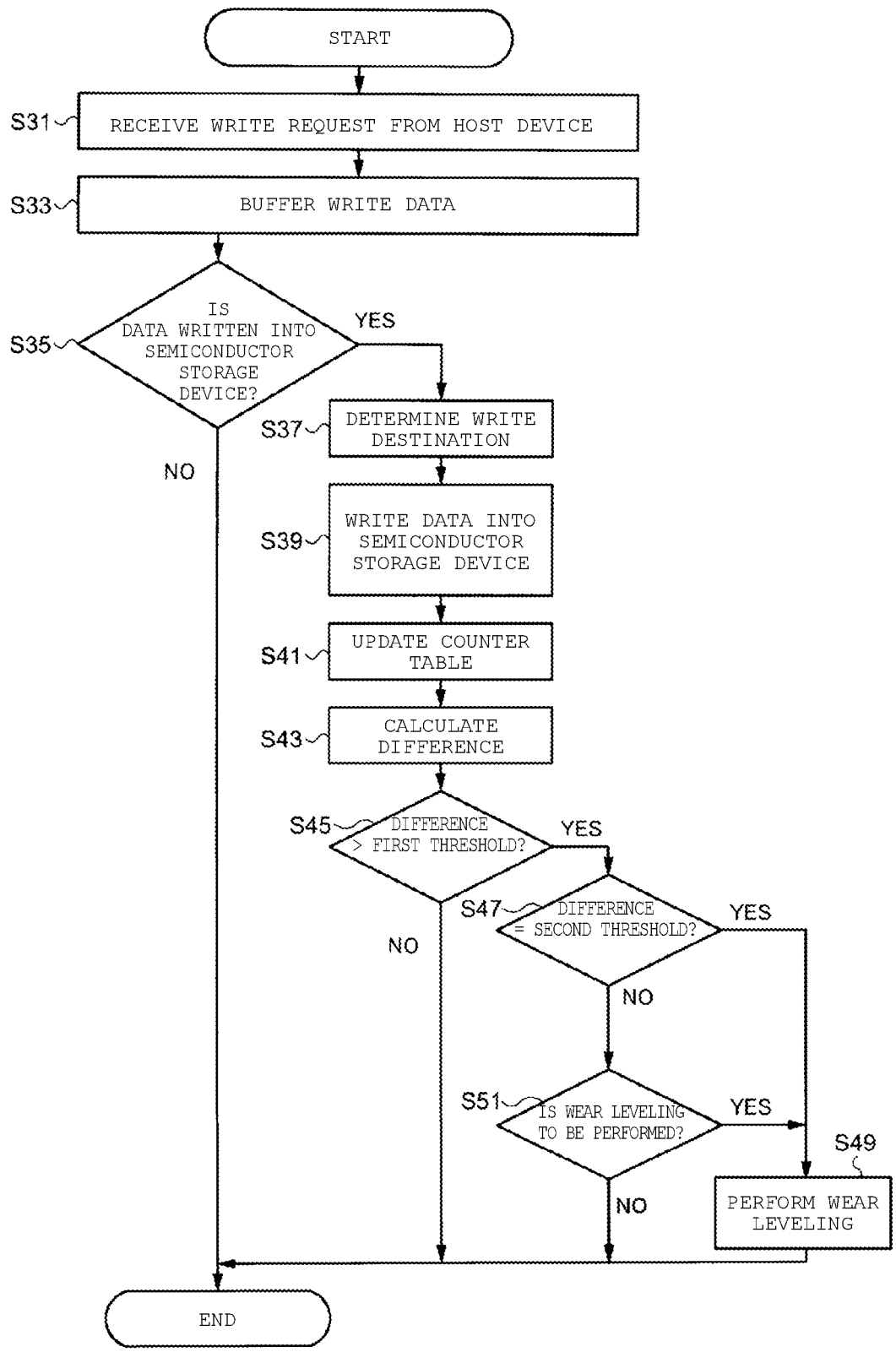
FIG. 3 is a flowchart of a write operation in a memory system according to a first embodiment.

With reference to FIGS. 1 to 3, the data write operation of the semiconductor storage device 1 in the memory system 3 according to the first embodiment will be described. FIG. 3 is a flowchart of the data write operation of the semiconductor storage device 1 in the memory system 3 according to the first embodiment. The data write operation and the wear leveling of the memory system 3 according to the first embodiment are not limited to the example shown in FIG. 3. Descriptions of the configurations the same as or similar to configurations in FIGS. 1 and 3 may be omitted in some cases. In the first embodiment, a case where the data write operation is performed on the semiconductor storage device 1B has been described. The data write operation is not limited to the example described herein. The data write operation may be performed on the semiconductor storage device 1A, or may be performed on both the semiconductor storage device 1A and the semiconductor storage device 1B. The configuration of the data write operation according to the first embodiment may be appropriately modified within the scope not departing from the concept of the present disclosure.

As shown in FIG. 3, the data write operation of the semiconductor storage device 1 (see FIG. 1) in the memory system 3 is started. First, in Step 31 (S31), the memory controller 2 receives a signal including a host write request and write data from the host device 4. The write data is also called user data. Specifically, the control circuit 22 receives the signal including the host write request and the write data from the host device 4 via the host I/F 21.

Next, in Step 33 (S33), the write data is buffered. The control circuit 22 transmits the write data to a write buffer in the memory controller 2, and temporarily stores the write data in the write buffer. In such a case, the control circuit 22 may transmit a notification indicating that the host write operation is completed (hereinafter referred to as "write operation completion notification") to the host device 4. In addition, the control circuit 22 may temporarily store the write data in a storage device in the control circuit 22.

Next, in Step 35 (S35), the control circuit 22 determines whether to write the write data on the semiconductor storage device 1B using the signal including the received host write request. As a result of the determination, when the write data is not written on the semiconductor storage device 1B (NO), the control circuit 22 does not perform the write operation of the write data on the semiconductor storage device 1B, and the memory system 3 ends the data write operation.

As a result of the determination, when the write data is written on the semiconductor storage device 1B (YES), the control circuit 22 determines a write destination in Step 37 (S37). Specifically, the control circuit 22 determines to write the write data on any page PAG of the plurality of pages PAG of the memory cell array 11B using the signal including the received host write request. For example, the control circuit 22 determines to write the write data into the page PAGi of the memory cell array 11B. Specifically, the control circuit 22 acquires from the address translation table 35 an address of the write destination corresponding to the logical address indicated by the signal including the received host write request. Alternatively, the control circuit 22 determines a page (FREE PAGE) that is not associated with any logical page, as the write destination. In such a case, based on the wear information, the page PAG which is less exhausted and does not store any data may be determined as the write destination.

Next, in Step 39 (S39), the control circuit 22 transmits a signal for the data write operation on the predetermined page PAG of the memory cell array 11B in the semiconductor storage device 1B via the memory I/F 27B. The control circuit 22 reads the write data from the storage device 30 in the write buffer or the control circuit 22, and transmits the read write data to the semiconductor storage device 1B via the memory I/F 27B. The semiconductor storage device 1B writes the write data on the predetermined page PAG of the memory cell array 11B, and stores the write data in the predetermined page PAG. For example, the semiconductor storage device 1B writes the write data into the page PAGi of the memory cell array 11B, and stores the write data in the page PAGi of the memory cell array 11B.

In Step 39 (S39), the memory system 3 may write other related data based on the write data being written to the semiconductor storage device 1B. For example, the memory system 3 may generate an error correction code (ECC) using the write data, and the memory system 3 or the control circuit 22 may write the error correction code ECC in the semiconductor storage device 1B. For example, the memory system 3 may encrypt the write data, and the memory system 3 or the control circuit 22 may write the encrypted data in the semiconductor storage device 1B. For example, the memory system 3 may generate randomized data using the write data and random numbers, and the memory system 3 or the control circuit 22 may write the randomized data in the semiconductor storage device 1B.

The error correction code ECC or the randomized data may be generated in a unit of a plurality of pages PAG. In addition, the semiconductor storage device that stores the error correction code ECC may be different from the semiconductor storage device that stores the write data.

Next, in Step 41 (S41), the counter circuit 25 updates the number of the write operations (count value) of the predetermined page PAG of the memory cell array 11B. That is, the counter circuit 25 updates the counter table 31. For example, the counter circuit 25 increments the count value of the predetermined page PAG of the memory cell array 11B from n to n+1. For example, in the counter circuit 25, when the original count value of the page PAGi of the memory cell array 11B is 900, the counter circuit 25 increments the count value of the page PAGi of the memory cell array 11B to 901.

Next, in Step 43 (S43), the control circuit 22 or the wear leveling control circuit 23 calculates a difference. The control circuit 22 or the wear leveling control circuit 23 receives the updated number of the write operations (the updated count value) on the predetermined page PAG of the memory cell array 11B from the counter circuit 25. In addition, the control circuit 22 or the wear leveling control circuit 23 receives a wear leveling cycle, the first threshold, and the second threshold, which are stored in the setting information table 34 of the memory 32. The control circuit 22 or the wear leveling control circuit 23 calculates the difference using the updated number of the write operations and the wear leveling cycle. In the following description, as an example, the wear leveling cycle is 1,001 times, the first threshold is 900 times, and the second threshold is 1,000 times. As described above, the difference is the remainder when the count value after updating the number of the write operations is divided by the wear leveling cycle.

In the first embodiment, the difference may be a statistical value such as a distribution of the number of the data write operations in each page PAG. Since the statistical value is used for the difference, the memory system 3 can perform the wear leveling so that variations or the distribution of the number of the data write operations is smaller than a value set in advance. Therefore, the data write operations in each memory cell or the page PAG can be further leveled.

Next, in Step 45 (S45), the wear leveling control circuit 23 compares the difference with the first threshold, and determines whether the difference is greater than the first threshold. The result of determining whether the difference is greater than the first threshold is referred to as a first determination result.

When the difference is smaller than the first threshold (NO), the wear leveling control circuit 23 does not perform the wear leveling on the predetermined page PAG of the memory cell array 11B. The first determination result indicates that the difference is smaller than the first threshold. The control circuit 22 or the wear leveling control circuit 23 does not perform the wear leveling in accordance with the first determination result, and the memory system 3 ends the data write operation.

For example, when the updated number of the write operations on the predetermined page PAG of the memory cell array 11B is 800, the difference is 800, which is the remainder when the number of the write operations of 800 times is divided by the wear leveling cycle of 1,001 times. As a result of the determination, the difference is smaller than the first threshold. Accordingly, the wear leveling control circuit 23 does not perform the wear leveling on the predetermined page PAG of the memory cell array 11B, and the memory system 3 ends the data write operation.

When the difference is greater than the first threshold (YES), the memory system 3 performs Step 47 (S47). In Step 47 (S47), the wear leveling control circuit 23 determines whether the difference is the same as the second threshold.

In Step 47 (S47), when the wear leveling control circuit 23 determines that the difference is the same as the second threshold (YES), in Step 49 (S49), the wear leveling control circuit 23 performs the wear leveling on the predetermined page PAG of the memory cell array 11B. A second determination result indicates that the difference is greater than the first threshold, and a third determination result indicates that the difference is the same as the second threshold. A fourth determination result indicates that the wear leveling is to be performed on the predetermined page PAG of the memory cell array 11B based on the third determination result. The control circuit 22 or the wear leveling control circuit 23 performs the wear leveling on the predetermined page PAG of the memory cell array 11B using the first determination result, the third determination result, and the fourth determination result, and the memory system 3 ends the wear leveling and the data write operation.

In Step 47 (S47), for example, when the updated number of the write operations on the predetermined page PAG of the memory cell array 11B is 1,000, the difference is 1,000, which is the remainder when the number of the write operations of 1,000 times is divided by the wear leveling cycle of 1,001 times. That is, the difference of 1,000 is the same as the second threshold (YES in Step 47 (S47)). As a result, in Step 49 (S49), the wear leveling control circuit 23 performs the wear leveling on the predetermined page PAG of the memory cell array 11B, and the memory system 3 ends the wear leveling and the data write operation.

In Step 47 (S47), when the wear leveling control circuit 23 determines that the difference is not the same as the second threshold (NO), in Step 51 (S51), the wear leveling control circuit 23 determines whether to perform the wear leveling on the predetermined page PAG of the memory cell array 11B. A case where the difference is not the same as the second threshold is a case where the difference is between the first threshold and the second threshold.

In a YES in Step 51 (S51), in Step 49 (S49), the wear leveling control circuit 23 performs the wear leveling on the predetermined page PAG of the memory cell array 11B, and the memory system 3 ends the wear leveling and the data write operation. A fifth determination result indicates that the difference is between the first threshold and the second threshold, and a sixth determination result indicates that the wear leveling is to be performed on the predetermined page PAG of the memory cell array 11B based on the fifth determination result.

On the other hand, for example, when the wear leveling is performed with a probability of 20%, even when the difference is between the first threshold and the second threshold, the wear leveling control circuit 23 does not perform the wear leveling on the predetermined page PAG of the memory cell array 11B with a probability of 80% (NO in Step 51 (S51)). In a NO in Step 51 (S51), the wear leveling control circuit 23 does not perform the wear leveling on the predetermined page PAG of the memory cell array 11B, and the memory system 3 ends the data write operation. In such a case, the fifth determination result indicates that the difference is between the first threshold and the second threshold. A seventh determination result indicates that the wear leveling is not to be performed on the predetermined page PAG of the memory cell array 11B based on the fifth determination result.

As described above, the memory system 3 according to the first embodiment performs the data write operation and the wear leveling.

2-3. Modification Example of Data Write Operation

Figure 4:
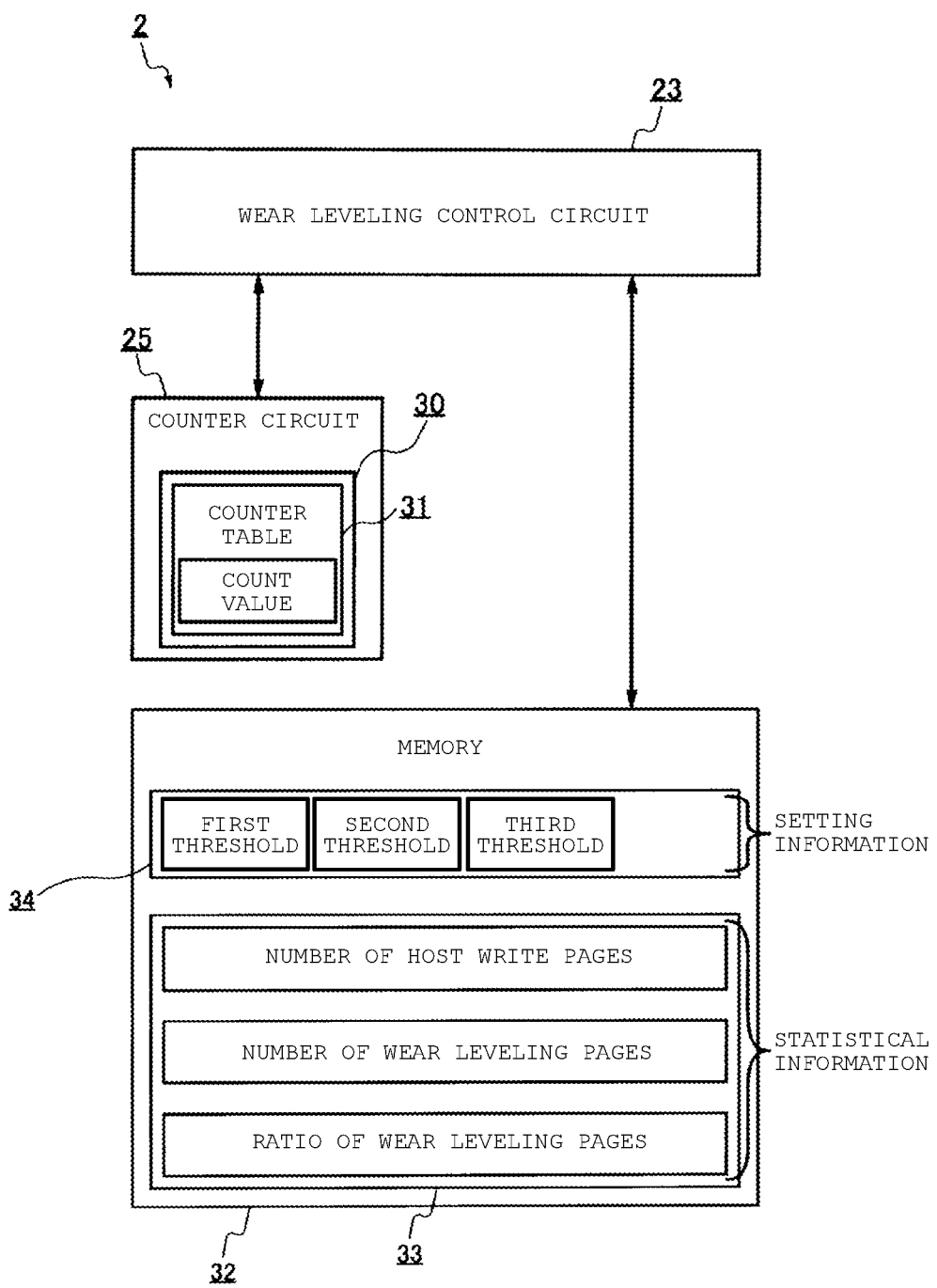
FIG. 4 depicts aspects related to an operation concerning whether to perform wear leveling in a memory system according to a first embodiment.

With reference to FIGS. 1 to 4, a modification example of the data write operation of the semiconductor storage device 1 in the memory system 3 according to the first embodiment will be described. FIG. 4 depicts aspects related to an operation concerning whether to perform the wear leveling in the memory system 3 according to the first embodiment. The data write operation and the wear leveling of the memory system 3 according to the first embodiment are not limited to the example shown in FIG. 4. Descriptions of the configurations the same as or similar to configurations in FIGS. 1 to 3 may be omitted in some cases. In the modification example of the data write operation of the semiconductor storage device 1 in the memory system 3 according to the first embodiment, Step 51 (S51) is mainly different from that in the example of the data write operation shown in FIG. 3. In the description of the modification example of the data write operation of the semiconductor storage device 1 in the memory system 3 according to the first embodiment with reference to FIG. 4, points different from those in FIG. 3 will mainly be described, and description will appropriately be added.

In the modification example of the data write operation of the semiconductor storage device 1 in the memory system 3, in Step 51 (S51), instead of the process of described in Step 51 (S51) with reference to FIG. 3, the wear leveling control circuit 23 determines whether to perform the wear leveling on the predetermined page PAG of the memory cell array 11B using information based on an operation rate of the wear leveling, in the statistical information stored in the statistical information table 33 in the memory controller 2.

The statistical information includes a predetermined ratio (hereinafter referred to as the third threshold). In Step 51 (S51) according to the modification example of the data write operation, when the difference is between the first threshold and the second threshold, which is described with reference to FIG. 3, a result of determining whether the statistical information is equal to or smaller than the third threshold p (p is a numerical value greater than 0) is used as a condition for determining whether to perform the wear leveling on the predetermined page PAG of the memory cell array 11B.

The statistical information may be any information related to the operation rate of the wear leveling. Specifically, as shown in FIG. 4, the statistical information includes the number of host write pages, the number of wear leveling pages, and a ratio of the number of wear leveling pages to the number of host write pages (hereinafter referred to as the first ratio).

In the first embodiment, for example, when the memory controller 2 receives the signal including the host write request from the host device 4, writing the write data on the semiconductor storage device 1 by the memory controller 2 is called the host write. In the first embodiment, the number of host write pages is the number of pages of the semiconductor storage device 1 on which the write data is written by the host write. In addition, in the first embodiment, the number of wear leveling pages is the number of pages of the semiconductor storage device 1 on which the data is written by the wear leveling.

For example, the wear leveling control circuit 23 calculates the number of pages on which the data write operation is performed on the predetermined page PAG of the memory cell array 11 of the semiconductor storage device 1 by the host write, calculates the total number of pages on which the data write operation is performed, adds the calculated number of pages to the number of the host write pages, and updates the number of the host write pages k (where k is a positive integer) (the statistical information) stored in the statistical information table 33 of the memory 32. In addition, the wear leveling control circuit 23 calculates the number of pages which is the number of pages on which the wear leveling is performed, calculates the total number of pages on which the wear leveling is performed, and adds the calculated number of pages to the number of the wear leveling page, and updates the number of the wear leveling pages m (where m is a positive integer) (the statistical information) stored in the statistical information table 33 of the memory 32.

For example, each time the data write operation is performed, the wear leveling control circuit 23 calculates the first ratio (m/k) using the number of the host write pages stored in the statistical information table 33, the number of the wear leveling pages, and the third threshold (p) stored in the setting information table 34 of the memory 32, and determines whether the first ratio (m/k) is equal to or greater than the third threshold (p).

For example, when the number of the write operations on a particular page PAG of the semiconductor storage device 1 is 900, the host write is performed once on the particular page PAG of the semiconductor storage device 1, and the wear leveling is performed, the data written on the particular page PAG of the semiconductor storage device 1A is moved to another page PAG2 of the semiconductor storage device 1B. In such a case, the number of the write operations on the particular page PAG of the semiconductor storage device 1 reaches 901 after one is added to 900. Here, the difference is 901, which is the remainder when the number of the write operations of 901 times is divided by the wear leveling cycle of 1,001 times. The difference is between the first threshold (900 times in this example) and the second threshold (1,000 times in this example). The wear leveling control circuit 23 performs the wear leveling, and moves the data written on the particular page PAG of the semiconductor storage device 1A to the other page PAG2 of the semiconductor storage device 1B. Then, the control circuit 22 or the wear leveling control circuit 23 adds one to the number of the host write pages as the data write operation is performed on the particular page PAG of the memory cell array 11 of the semiconductor storage device 1 by the host write, and updates the statistical information (such as, the number of the host write pages k) stored in the statistical information table 33 of the memory 32. In addition, the control circuit 22 or the wear leveling control circuit 23 calculates the number of pages on which the wear leveling is performed, adds the calculated number of pages to the number of the wear leveling pages, and updates the statistical information (such as, the number of the wear leveling pages m) stored in the statistical information table 33 of the memory 32.

In Step 51 (S51) according to the modification example of the data write operation, the difference is between the first threshold and the second threshold, and it is determined whether the first ratio is equal to or smaller than the third threshold. In Step 51 (S51) according to the modification example of the data write operation, the wear leveling control circuit 23 determines whether to perform the wear leveling. When the first ratio is equal to or smaller than the third threshold, the wear leveling control circuit 23 performs the wear leveling (YES in Step 51 (S51)). In a YES in Step 51 (S51), the wear leveling control circuit 23 performs the wear leveling, and the memory system 3 ends the wear leveling and the data write operation.

On the other hand, in Step 51 (S51), when the first ratio is greater than the third threshold, the wear leveling control circuit 23 does not perform the wear leveling (NO in Step 51 (S51)). In a NO in Step 51 (S51), the wear leveling control circuit 23 does not perform the wear leveling on the predetermined page PAG of the memory cell array 11B, and the memory system 3 ends the write operation.

As described above, in the first embodiment, when the write operation and the wear leveling are performed using the information based on the operation rate of the wear leveling, the number of the write operations is limited by two thresholds. Since the wear leveling which can be performed at one time is limited, it is possible to shift a timing to perform the wear leveling. Therefore, the memory system 3 according to the first embodiment more effectively reduce a possibility that the data write operation (a rewrite) on each page PAG of the semiconductor storage device 1 associated with the wear leveling may be concentrated on a specific period of time. Accordingly, it is possible to prevent performance deterioration of the memory system.

2-4. Example of Wear Leveling

Figure 5:
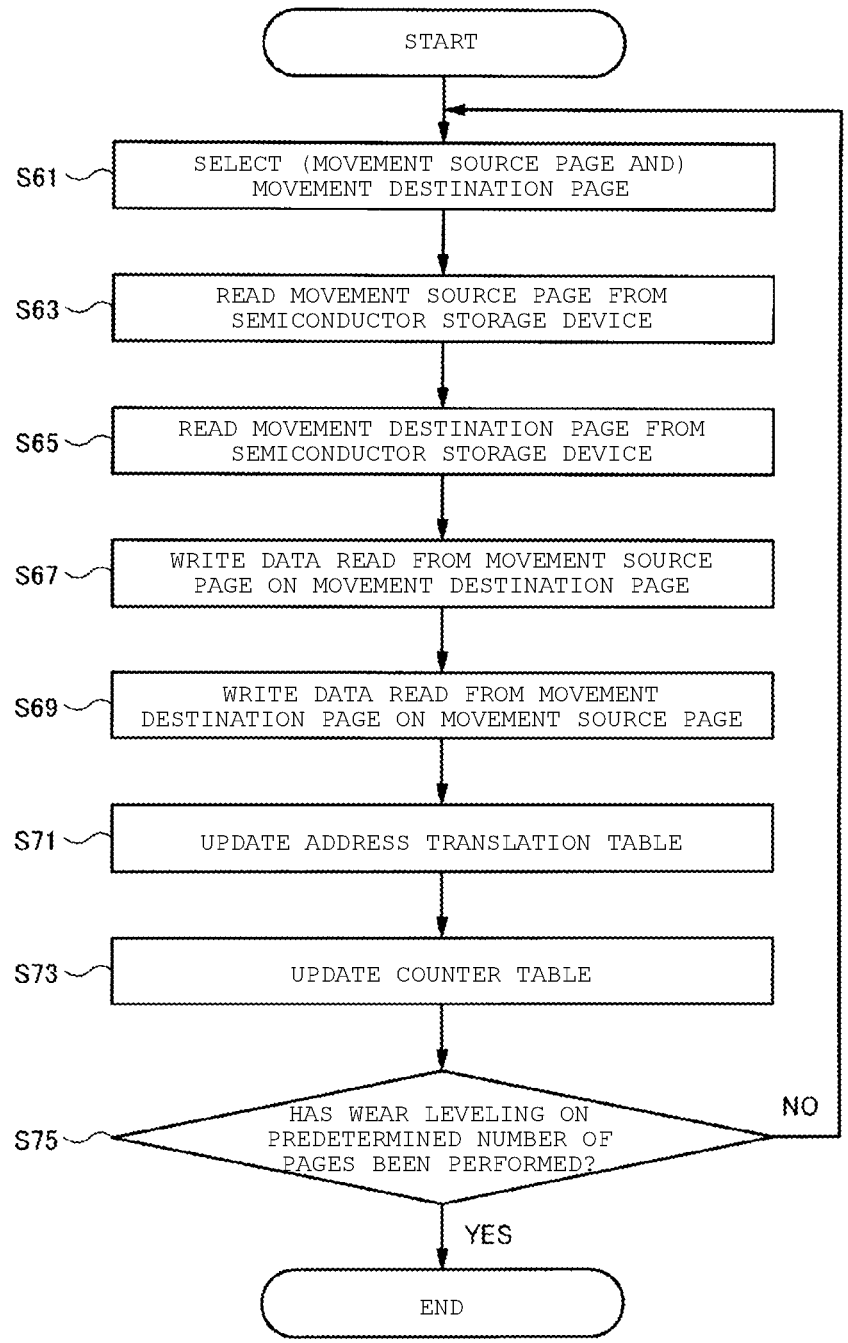
FIG. 5 is a flowchart of wear leveling in a memory system according to a first embodiment.
Figure 6A:
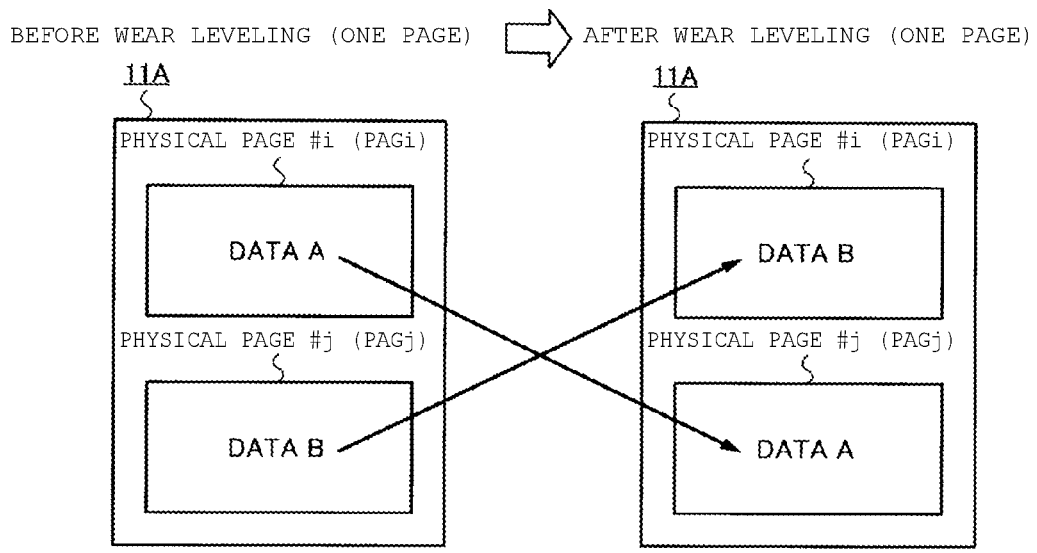
FIG. 6A depicts a semiconductor storage device before and after wear leveling has been performed in a memory system according to a first embodiment.
Figure 6B:
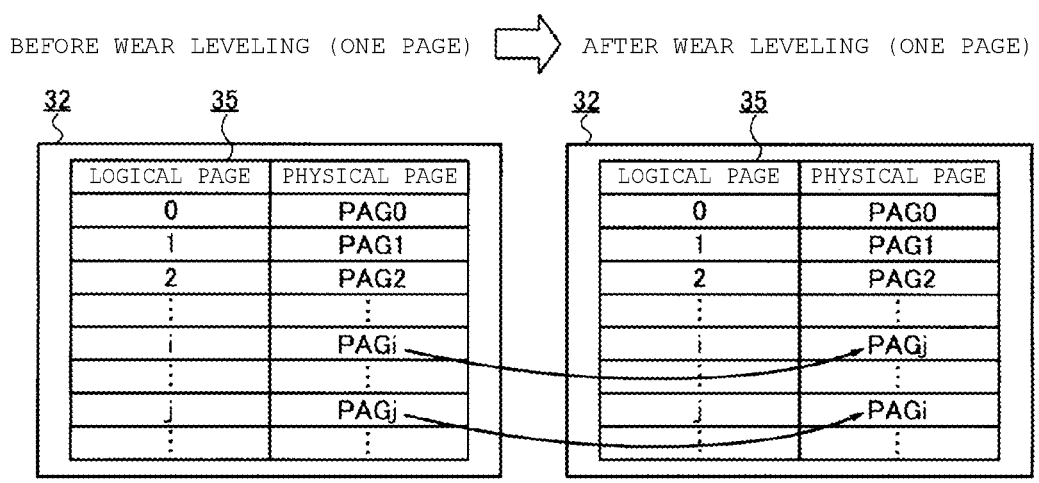
FIG. 6B depicts a translation table before and after wear leveling has been performed according to a first embodiment.
Figure 6C:
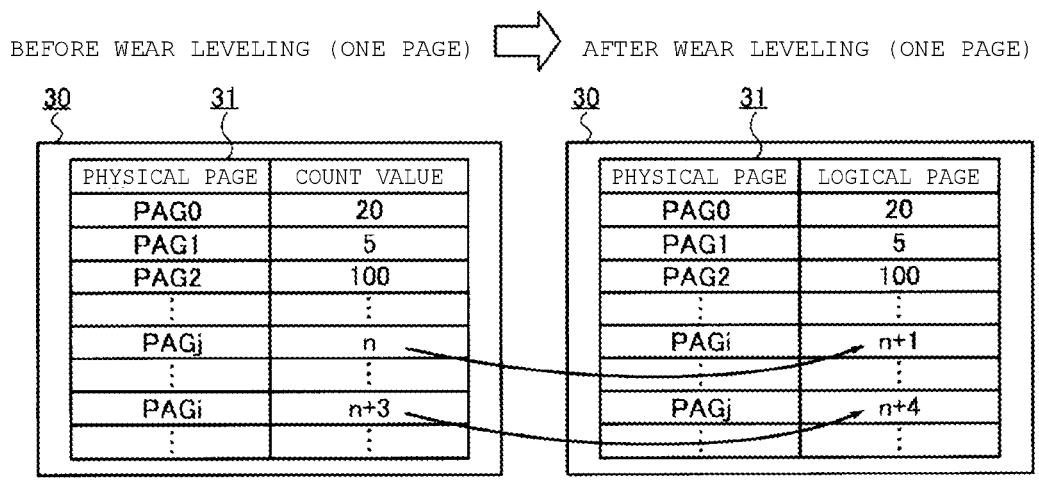
FIG. 6C depicts a write operation counter before and after wear leveling has been performed according to a first embodiment.

With reference to FIGS. 1, 5, and 6A to 6C, the wear leveling in the memory system 3 according to the first embodiment will be described. FIG. 5 is a flowchart of the wear leveling in the memory system 3 according to the first embodiment. FIG. 6A depicts the semiconductor storage device 1 before and after the wear leveling has been performed in the memory system 3 according to the first embodiment. FIG. 6B depicts a translation table before and after the wear leveling has been performed according to the first embodiment. FIG. 6C depicts the write operation counter before and after the wear leveling has been performed according to the first embodiment. The wear leveling of the memory system 3 according to the first embodiment is not limited to the examples shown in FIGS. 5 and 6A to 6C. Descriptions of the configurations the same as or similar to configurations in FIGS. 1 to 4 may be omitted in some cases.

As shown in FIG. 5, the wear leveling of the semiconductor storage device 1 in the memory system 3 (FIG. 1) is started. As described above, for example, in the memory system 3, the wear leveling control circuit 23 controls the semiconductor storage device 1B to perform the wear leveling through Step 45 (S45), Step 47 (S47), and Step 49 (S49) which are described with reference to FIGS. 3 and 4. In such a case, for example, the wear leveling control circuit 23 stores in the memory 32 data of the page on which the wear leveling is performed.

The control circuit 22 or the wear leveling control circuit 23 selects a page (hereinafter referred to as the movement destination page) of the semiconductor storage device 1 to which the data is moved from a page (hereinafter referred to as the movement source page) of the semiconductor storage device 1 on which the wear leveling is performed. In the description of Section 2-4, for example, the movement source page is the page PAGi of the memory cell array 11B of the semiconductor storage device 1B, and the movement destination page is the PAGj of the memory cell array 11B of the semiconductor storage device 1B. In addition, the page PAGi of the memory cell array 11B of the semiconductor storage device 1B stores data A (DATA A), and the page PAGj of the memory cell array 11B of the semiconductor storage device 1B stores data B (DATA B).

For example, the page PAG having the smallest number of the write operations (count value) in the counter circuit 25 may be selected as the movement destination page. The page PAG in which the number of the write operations (count value) in the counter circuit 25 is smaller than a predetermined threshold may be selected. Alternatively, the page PAG may be randomly selected using a random number circuit. In addition, for example, the page PAG having the largest number of the write operations (count value) in the counter circuit 25 may be selected as the movement source page. The page PAG in which the number of the write operations (count value) in the counter circuit 25 is equal to or greater than a predetermined threshold may be selected. Alternatively, the page PAG may be randomly selected using the random number circuit. The method of selecting the movement destination page and the movement source page according to the first embodiment may be appropriately modified within the scope not departing from the concept of the present disclosure.

Next, in Step 63 (S63), the control circuit 22 or the wear leveling control circuit 23 transmits a signal for selecting the page PAGi of the memory cell array 11B to the semiconductor storage device 1B via the memory I/F 27B. Subsequently, the semiconductor storage device 1B receives the signal for selecting the page PAGi of the memory cell array 11B, and reads the data A stored in the page PAGi of the memory cell array 11B. The semiconductor storage device 1B transmits the data A to the control circuit 22 or the wear leveling control circuit 23 via the memory I/F 27B.

Next, in Step 65 (S65), the control circuit 22 or the wear leveling control circuit 23 transmits a signal for selecting the page PAGj of the memory cell array 11B to the semiconductor storage device 1B via the memory I/F 27B. The semiconductor storage device 1B receives the signal for selecting the page PAGj of the memory cell array 11B, and reads the data B stored in the page PAGj of the memory cell array 11B. The semiconductor storage device 1B transmits the data B to the control circuit 22 or the wear leveling control circuit 23 via the memory I/F 27B.

Next, in Step 67 (S67), the control circuit 22 or the wear leveling control circuit 23 transmits the signal for selecting the page PAGj of the memory cell array 11B and the data A to the semiconductor storage device 1B via the memory I/F 27B. The semiconductor storage device 1B receives the signal for selecting the page PAGj of the memory cell array 11B and the data A. The semiconductor storage device 1B selects the page PAGj of the memory cell array 11B, and writes the data A into the page PAGj of the memory cell array 11B. The page PAGj of the memory cell array 11B stores the data A.

Next, in Step 69 (S69), the control circuit 22 or the wear leveling control circuit 23 transmits a signal for selecting the page PAGi of the memory cell array 11B and the data B to the semiconductor storage device 1B via the memory I/F 27B. The semiconductor storage device 1B receives the signal for selecting the page PAGi of the memory cell array 11B and the data B. The semiconductor storage device 1B selects the page PAGi of the memory cell array 11B, and writes the data B into the page PAGi of the memory cell array 11B. The page PAGi of the memory cell array 11B stores the data B.

As shown in FIG. 6A, since Step 61 (S61) to Step 69 (S69) are performed, the data stored in the movement source page and the data stored in the movement destination page can be swapped.

As shown in FIG. 5, when Step 69 (S69) ends, in Step (S71), the control circuit 22 updates the address translation table 35 of the memory 32.

Specifically, as shown in FIG. 6A, the control circuit 22 swaps the data A stored in the page PAGi of the memory cell array 11B of and the semiconductor storage device 1B for the data B stored in the page PAGj of the memory cell array 11B of the semiconductor storage device 1B. In addition, as shown in FIG. 6B, in the address translation table 35 stored in the memory 32, the control circuit 22 updates the page PAGi of the memory cell array 11B of the semiconductor storage device 1B stored as a physical page corresponding to a logical page to the page PAGj of the memory cell array 11B of the semiconductor storage device 1B. Here, a value of the logical page corresponds to the logical address. The value of the physical page is associated with the page PAG of the memory cell array 11B in which the data is physically stored.

As shown in FIG. 5, next, in Step 73 (S73), the count value stored in the counter table 31 of the storage device 30 is updated. Since Step 61 (S61) to Step 71 (S71) are performed, the data stored in the movement source page and the data stored in the movement destination are swapped, and the address translation table 35 is updated. Therefore, the control circuit 22 or the wear leveling control circuit 23 transmits a signal for updating the counter table 31 to the counter circuit 25 of the storage device 30.

The counter circuit 25 receives the signal for updating the counter table 31. As shown in FIG. 6C, based on the received signal for updating the counter table 31, the counter circuit 25 increments the count value of the page PAGi of the memory cell array 11B, the count value of the page PAGj of the memory cell array 11B, and the count value of the page PAGl of the memory cell array 11A.

As shown in FIG. 5, in Step 75 (S75), it is determined whether the wear leveling has been performed on the predetermined number of pages. The wear leveling control circuit 23 determines whether the wear leveling has been performed on the predetermined number of the pages PAG of the memory cell array 11 of the semiconductor storage device 1 on which the wear leveling is to be performed.

When the wear leveling control circuit 23 has not performed the wear leveling on the predetermined number of the pages PAG of the memory cell array 11 of the semiconductor storage device 1 (NO), the wear leveling control circuit 23 returns to Step 61 (S61), and performs the processes in Step 61 (S61) to Step 73 (S73).

When the control circuit 22 or the wear leveling control circuit 23 has performed the wear leveling on the predetermined number of the pages PAG of the memory cell array 11 of the semiconductor storage device 1 (YES), the memory system 3 ends the wear leveling.

2-5. Modification Example of Wear Leveling

Figure 7:
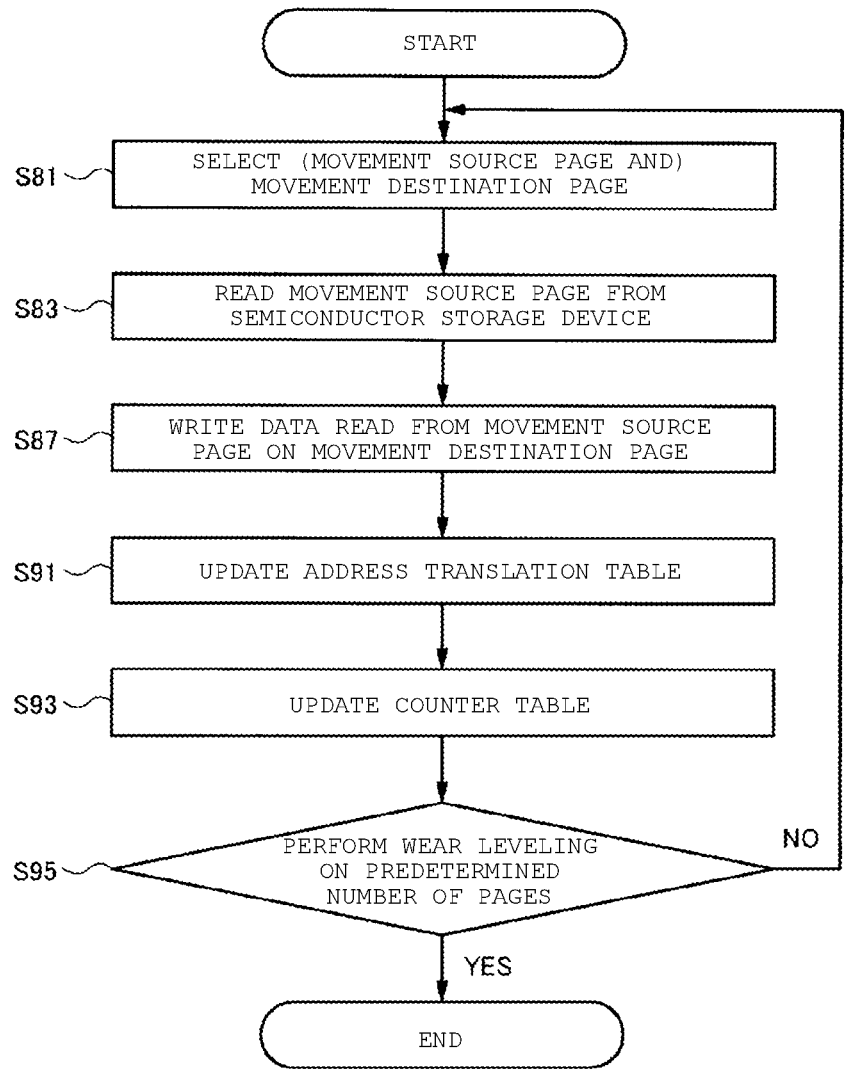
FIG. 7 is a flowchart of wear leveling in a memory system according to a first embodiment.
Figure 8A:
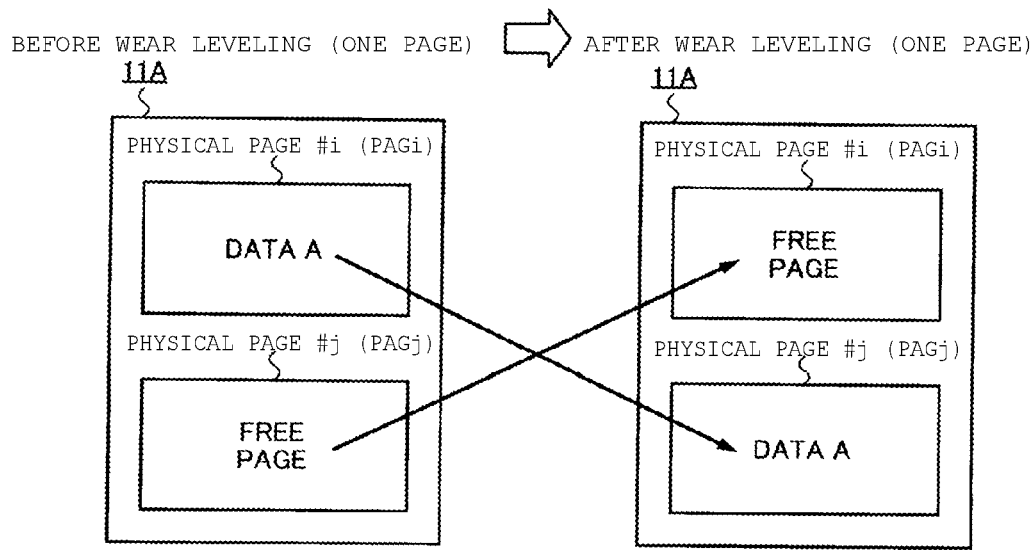
FIG. 8A depicts a semiconductor storage device before and after wear leveling has been performed in a memory system according to a first embodiment.
Figure 8B:
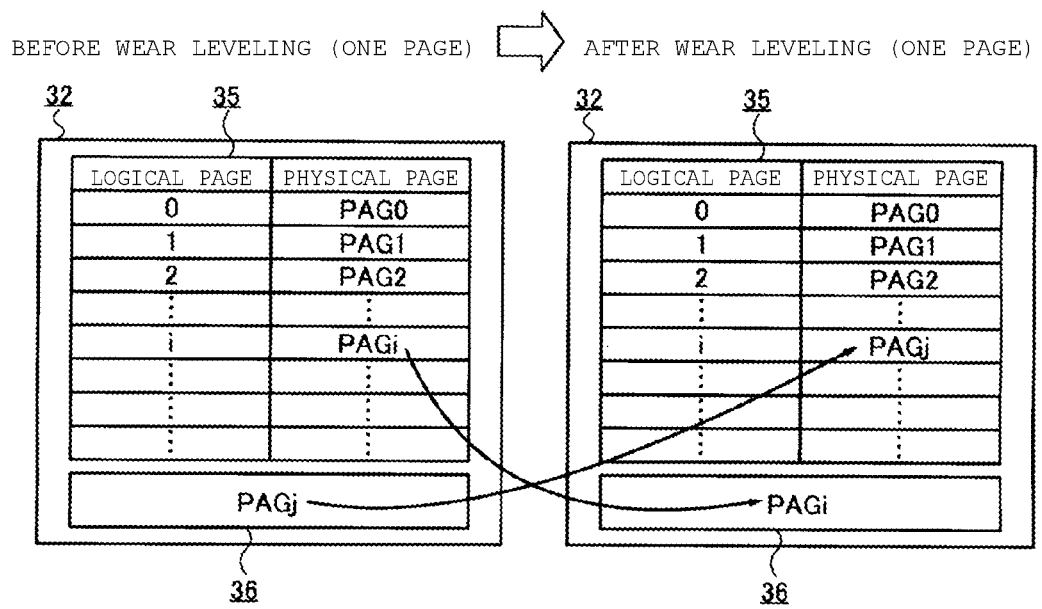
FIG. 8B depicts a translation table before and after wear leveling has been performed according to a first embodiment.

With reference to FIGS. 1, 6C, 7, 8A, and 8B, a modification example of the wear leveling in the memory system 3 according to the first embodiment will be described. FIG. 7 is a flowchart of the wear leveling in the memory system 3 according to the first embodiment. FIG. 8A depicts the semiconductor storage device 1 before and after the wear leveling has been performed in the memory system 3 according to the first embodiment. FIG. 8B depicts a translation table before and after the wear leveling has been performed according to the first embodiment. The modification example of the wear leveling of the memory system 3 according to the first embodiment is not limited to the examples shown in FIGS. 7, 8A, and 8B. Descriptions of the configurations the same as or similar to configurations in FIGS. 1 to 6C may be omitted in some cases.

In the modification example of the wear leveling, unlike the wear leveling described with reference to FIGS. 1, 5, 6A, and 6B in Section 2-4, the page PAGj of the memory cell array 11B which is the movement destination page is a page which is not associated with the logical page. Therefore, the data may not be read from the page PAGj of the memory cell array 11B which is the movement destination page. The rest is the same as that in the wear leveling described with reference to FIGS. 1, 5, 6A, and 6B. In the description of the modification example of the data write operation of the semiconductor storage device 1 in the memory system 3 according to the first embodiment with reference to FIGS. 1, 7, 8A, and 8B, points different from those in FIGS. 5, 6A, and 6B will mainly be described, and description will appropriately be added.

In the memory system 3 according to the first embodiment, even when the page PAG of the memory cell array 11 of the semiconductor storage device 1 is not associated with the logical page, the page PAG of the memory cell array 11 of the semiconductor storage device 1 may store information related to the page PAG such as a valid flag and a poison flag in some cases. In such a case, the control circuit 22 or the wear leveling control circuit 23 may read the information related to the page PAG, and may write the information related to the page PAG into the movement destination page. Here, the valid flag is a flag indicating whether the page PAG includes valid data, and the poison flag is a flag indicating that the data of the page PAG is damaged.

As shown in FIG. 7, the wear leveling of the semiconductor storage device 1 in the memory system 3 is started. As described above, in the memory system 3, the wear leveling control circuit 23 controls the semiconductor storage device 1B to perform the wear leveling through Step (S45), Step 47 (S47), and Step 49 (S49) (which are described with reference to FIGS. 3 and 4). In such a case, for example, the wear leveling control circuit 23 stores in the memory 32 the data of the page on which the wear leveling is performed.

Step 81 (S81), Step 83 (S83), Step 87 (S87), and Step 95 (S95) are the same as Step 61 (S61), Step 63 (S63), Step 67 (S67), and Step 75 (S75). Accordingly, description thereof will be omitted. In the description in Section 2-5, above, the movement source page is the page PAGi of the memory cell array 11B of the semiconductor storage device 1B, and the movement destination page is the page PAGj of the memory cell array 11B of the destination page semiconductor storage device 1B. In addition, as shown in FIG. 8A, the page PAGi of the memory cell array 11B of the semiconductor storage device 1B stores the data A (DATA A), and the page PAGj of the memory cell array 11B of the semiconductor storage device 1B is a page (a "FREE PAGE") which that is not associated with a logical page. In some examples, the free page may be any page PAG that presently stores unnecessary data (e.g., data marked as invalid or the like).

Since Step 81 (S81) to Step 87 (S87) are performed, the data stored in the movement source page can be read, and the data can be stored in the movement destination page.

As shown in FIG. 7, when Step 87 (S87) ends, in Step 91 (S91), the control circuit 22 updates the address translation table 35 and a free page list 36 stored in the memory 32. Specifically, as shown in FIG. 8B, the control circuit 22 swaps the page PAGi of the memory cell array 11B of the semiconductor storage device 1B stored as the physical page corresponding to the logical page stored in the memory 32 for the page PAGj of the memory cell array 11B of the semiconductor storage device 1B, and updates the address translation table 35 and the free page list 36 of the memory 32. The free page list 36 is a data structure (or a data list) for the memory controller 2 to manage FREE PAGEs which are not associated with any logical page. After the address translation table 35 and the free page list 36 are completely updated, as shown in FIG. 8A, the page PAGi becomes a FREE PAGE which is not associated with the logical page.

As shown in FIG. 7, next, in Step 93 (S93), the count value stored in the counter table 31 of the storage device 30 is updated. Since Step 81 (S81) to Step 91 (S91) are performed, the data stored in the movement source page and the movement destination page are stored, and the address translation table 35 is updated. Therefore, the control circuit 22 or the wear leveling control circuit 23 transmits a signal for updating the counter table 31 to the counter circuit 25 of the storage device 30. The counter circuit 25 receives the signal for updating the counter table 31, and updates the counter table 31. The configuration related to updating the counter table 31 is the same as that shown in FIG. 6C. Accordingly, description thereof will be omitted herein.

2-6. Example of Data Read Operation

With reference to FIGS. 1 and 9, the data read operation of the semiconductor storage device 1 in the memory system 3 according to the first embodiment will be described. FIG. 9 is a flowchart of the read operation in the memory system 3 according to the first embodiment. Descriptions of the configurations the same as or similar to configurations in FIGS. 1 to 8B may be omitted in some cases. In the first embodiment, as an example, a case where the read operation data is performed on the semiconductor storage device 1B has been described. The data read operation is not limited to the example described herein. The data read operation may be performed on the semiconductor storage device 1A, or may be performed on both the semiconductor storage device 1A and the semiconductor storage device 1B. The configuration of the data read operation according to the first embodiment may be appropriately modified within the scope not departing from the concept of the present disclosure.

As shown in FIG. 9, the data read operation of the semiconductor storage device 1 in the memory system 3 is started. First, in Step 101 (S101), the memory controller 2 receives a signal including a host read request from the host device 4. Specifically, the control circuit 22 receives the signal including the host read request from the host device 4 via the host I/F 21. The read data is data to be read from the semiconductor storage device 1B as the memory system 3 performs the data read operation.

Next, in Step 103 (S103), a write buffer is searched for. The control circuit 22 searches for the write buffer in the memory controller 2. Specifically, the control circuit 22 determines whether the read data is stored in the write buffer (checks whether the read data exists in the write buffer) using the signal including the received host read request. The read data may temporarily be stored in the memory 32 in the control circuit 22. In such a case, the control circuit 22 also searches for the memory 32 in the control circuit 22. The control circuit 22 may search for a read buffer.

Next, in Step 105 (S105), when the read data exists in the write buffer as a result of the determination in Step 103 (S130) (YES), in Step 107 (S107), the control circuit 22 transmits the read data existing in the write buffer from the write buffer to the host device 4 via the host I/F 21. The memory system 3 ends the data read operation. When the control circuit 22 searches for the read buffer, in Step 105 (S105), the control circuit 22 determines whether the read data is stored in the read buffer (whether the read data exists in the read buffer), and the control circuit 22 transmits the read data existing in the read buffer from the read buffer to the host device 4 via the host I/F 21.

In Step 105 (S105), when the read data does not exist in the write buffer (NO) as a result of the determination in Step 103 (S103), the control circuit 22 performs address translation in Step 109 (S109). Specifically, the control circuit 22 uses the received signal including the host read request, and translates a target address for reading the read data to the predetermined page PAG of the semiconductor storage device 1 for storing the read data. For example, the control circuit 22 translates the target address for reading the read data from the logical address to the physical address.

In Step 109 (S109), the control circuit 22 may perform the address translation using the address translation table 35, or may perform the address translation through calculation using the number of times of performing the wear leveling. In addition, the control circuit 22 may perform the address translation through calculation using the number of the write operations and the number of the read operations, or may perform the address translation through calculation using any two or more of the number of times of performing the wear leveling, the number of the write operations, and the number of the read operations.

Next, in Step 111 (S111), the control circuit 22 transmits a signal for selecting the page PAGi of the memory cell array 11B to the semiconductor storage device 1B via the memory I/F 27B. The semiconductor storage device 1B reads the read data stored in the page PAGi of the memory cell array 11B. In addition, the semiconductor storage device 1B transmits the read data to the control circuit 22 via the memory I/F 27B.

In Step 107 (S107) or Step 111 (S111), for example, the memory system 3 may decode the read data including the error correction code ECC. In addition, when the data written on the semiconductor storage device 1B is randomized data, in Step 107 (S107) or Step 111 (S111), the control circuit 22 cancels randomization of the read data.

Next, in Step 113 (S113), the control circuit 22 transmits read data to the host device 4 via the host I/F 21. As described above, the memory system 3 according to the first embodiment performs the data read operation.

2-7. Example of Throughput Transition During Sequential Write Operation

Figure 10:
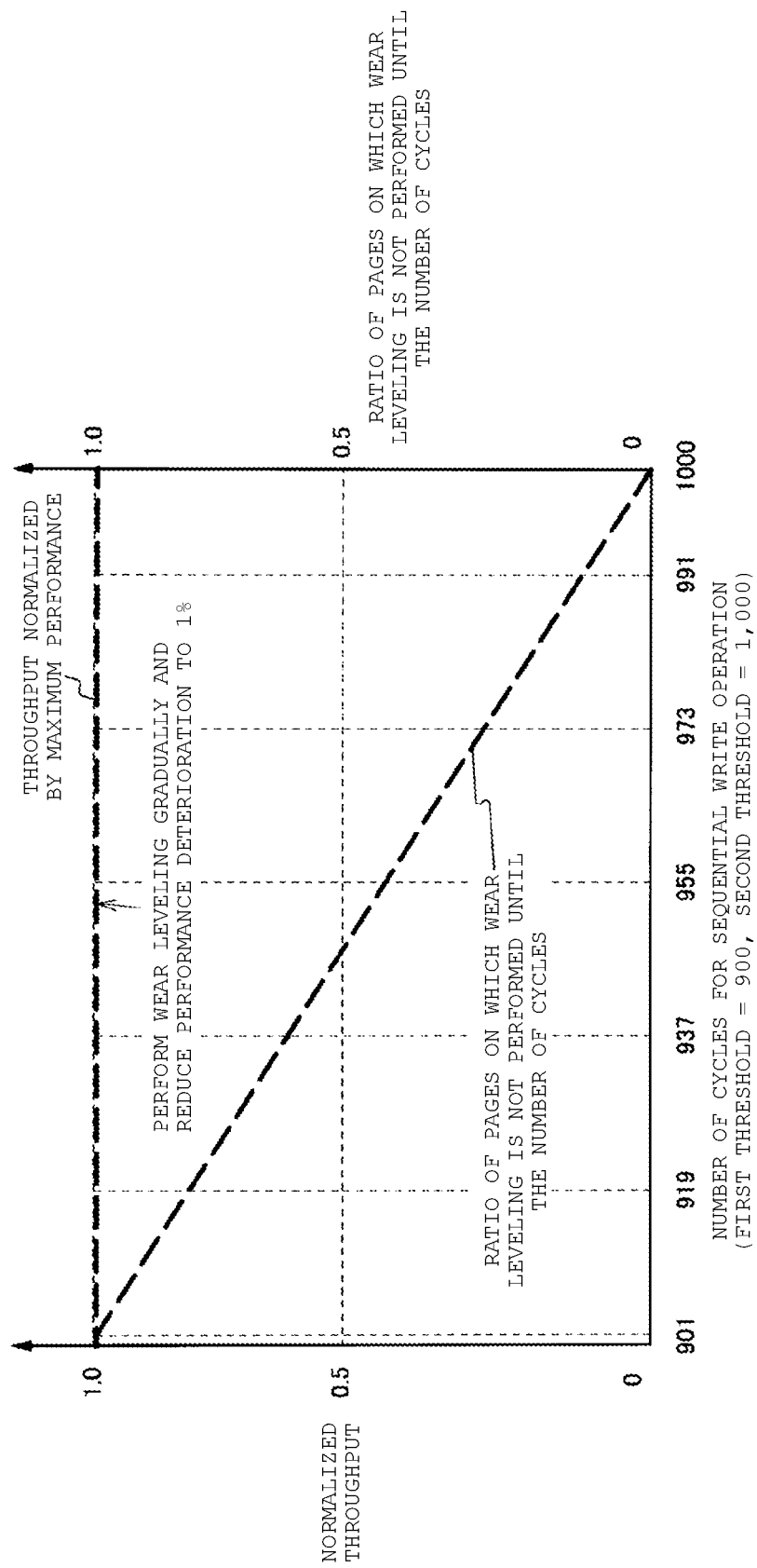
FIG. 10 depicts a graph related to throughput transition during a sequential write operation in a memory system according to a first embodiment.
Figure 11:
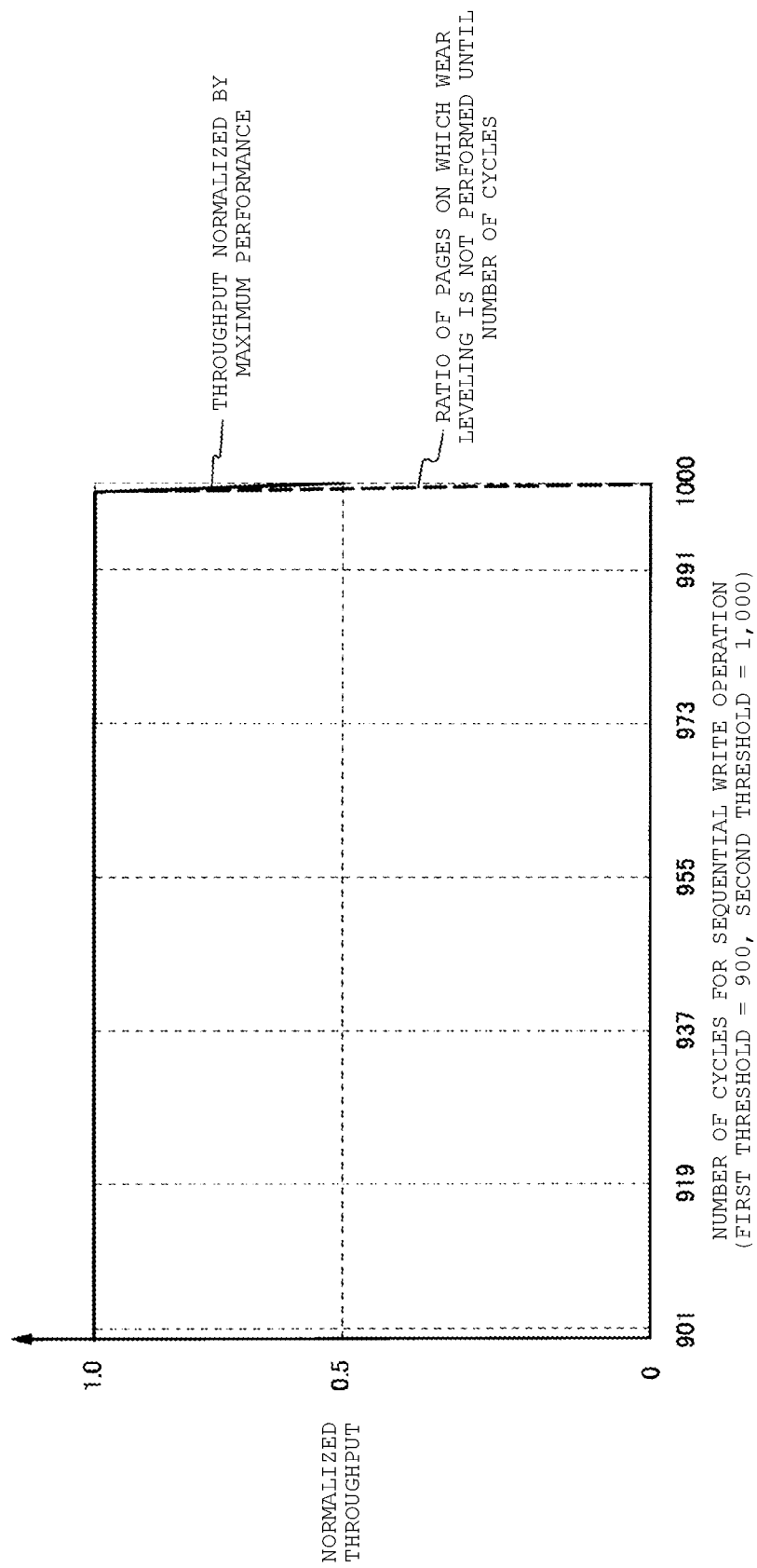
FIG. 11 depicts a graph related to throughput transition during a sequential write operation in a memory system according to a comparative example.

With reference to FIGS. 10 and 11, an example of throughput transition when a sequential write operation is performed in the memory system 3 according to the first embodiment will be described. FIG. 10 depicts a graph related to the throughput transition during the sequential write operation in the memory system 3 according to the first embodiment, and FIG. 11 depicts a graph related to throughput transition during a sequential write operation in a memory system according to a comparative example. The example of the throughput transition of the memory system 3 according to the first embodiment during the sequential write operation is not limited to the example shown in FIG. 10.

As an example, a throughput transition during the sequential write operation of the memory system 3 according to the first embodiment, the sequential write operation is repeatedly performed on all pages of the semiconductor storage device 1. Conditions under which the memory system 3 performs the wear leveling on a particular page are as follows: (1) the number of the write operations (the count value) on the page after the previous wear leveling is performed is 901 or more and 1,000 or less (that is, the first threshold has been set to 900, and the second threshold is set to 1,000), and (2) the wear leveling is performed for individual pages of the 99 host write pages. In the first embodiment, only the data write operations associated with a host write request from the host device 4 and the write operations associated with wear leveling are considered, and the data read operations associated with a host read request from the host device 4 and the data read operations associated with a refresh operation are not considered.

As shown in FIG. 10, a horizontal axis is the number of cycles in which the sequential write operation is performed, a left vertical axis is a normalized throughput in a state where the wear leveling is not performed, and a right vertical axis is a ratio of the number of pages on which the wear leveling is not performed in the number of cycles indicated by the horizontal axis.

As shown in FIG. 11, in the example of the throughput transition during the sequential write operation in the comparative example, when the count value for each page after the previous wear leveling has been performed exceeds 1,000, the wear leveling is performed on all of the pages all at once. As a result, when the number of the write operations on each page PAG after the previous wear leveling is performed exceeds 1,000, the number of pages on which the wear leveling is not performed until the number of cycles is 0, and the throughput normalized by maximum performance is equal to smaller than half (0.5). That is, in the comparative example, the performance deterioration of the memory system is equal to or smaller than the half.

On the other hand, as shown in FIG. 10, the throughput normalized by the maximum performance is 1.0. In the first embodiment, a ratio of the pages on which the wear leveling is not performed until the number of laps linearly decreases between the first threshold and the second threshold. As a result, in the first embodiment, the normalized throughput is 0.99, and the performance deterioration of the memory system 3 is reduced to 1%. Therefore, since the memory system 3 according to the first embodiment is used, it is possible to prevent the performance deterioration in the write operation.

Second Embodiment

Figure 12:
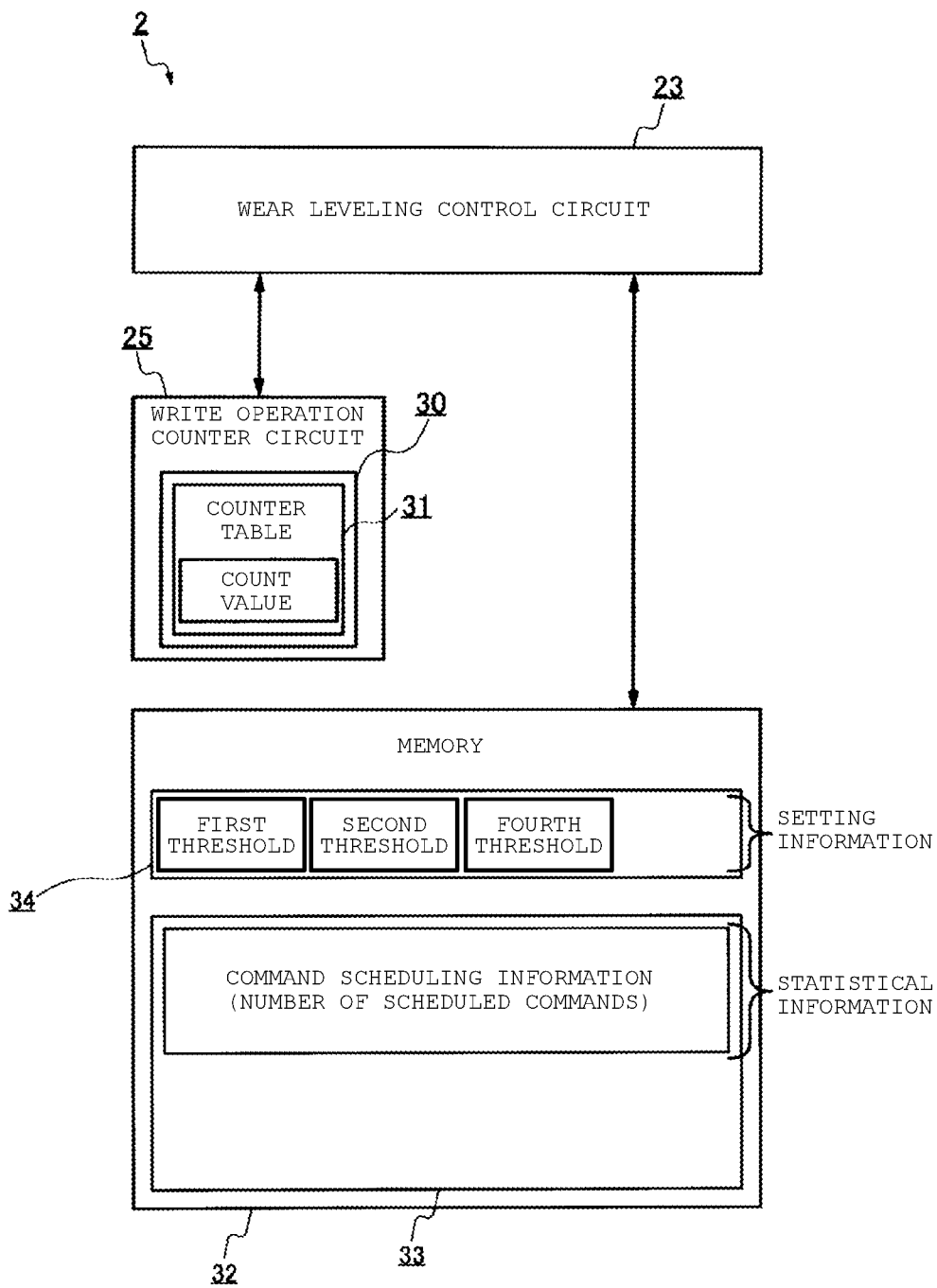
FIG. 12 depicts aspects related to an operation concerning whether to perform wear leveling in a memory system according to a second embodiment.

The memory system 3 according to a second embodiment will be described with reference to FIGS. 1 and 12. The memory system 3 according to the second embodiment is different from the memory system 3 according to the first embodiment in the write operation. FIG. 12 depicts aspects related to an operation concerning whether to perform the write operation in the memory system 3 according to the second embodiment. Hereinafter, points different from those of the first embodiment will mainly be described.

The write operation of the memory system 3 according to the second embodiment is different from the modification example of the write operation described with reference to FIGS. 1 to 4 in Section 2-3 in the following point. It is determined whether to perform the wear leveling on the predetermined page PAG of the memory cell array 11B using information based on an operation rate of the semiconductor storage device 1 in the statistical information stored in the statistical information table 33 of the memory 32 in the memory controller 2.

In Step 51 (S51) of the write operation of the memory system 3 according to the second embodiment, when the difference is between the first threshold and the second threshold, a result of determining whether the difference is equal to or smaller than the fourth threshold is used as a condition for determining whether to perform the wear leveling on the predetermined page PAG of the memory cell array 11B.

In the write operation of the memory system 3 according to the second embodiment, a predetermined ratio (referred to as a third threshold) is different from that of the modification example of the write operation described with reference to FIGS. 1 to 4. In the write operation of the memory system 3 according to the second embodiment, the number of predetermined operations is a fourth threshold. In the write operation of the memory system 3 according to the second embodiment, the statistical information may be any information related to the operation rate of the semiconductor storage device 1. For example, as shown in FIG. 12, the statistical information includes command scheduling information. For example, the command scheduling information is the number of scheduled commands.

The number of scheduled commands is the number of the data write operations or the number of data read operations scheduled by the memory controller 2 to be performed on the semiconductor storage device 1 (more particularly, the control circuit 22 or the wear leveling control circuit 23). In the second embodiment, the number of command scheduled commands may be referred to as the number of predetermined operations in some cases. The number of predetermined operations is the fourth threshold with respect to the number of predetermined operations.

The control circuit 22 or the wear leveling control circuit 23 increments the count value of the predetermined operation each time the semiconductor storage device 1 performs the scheduled data write operation or the scheduled data read operation, and updates the statistical information (count value of the predetermined operations) stored in the statistical information table 33 (see FIG. 12) of the memory 32 in the memory controller 2.

The control circuit 22 or the wear leveling control circuit 23 receives the number of command scheduled commands stored in the statistical information table 33 of the memory 32 in the memory controller 2 and the fourth threshold stored in the setting information table 34 of the memory 32. The control circuit 22 or the wear leveling control circuit 23 determines whether the number of command scheduled commands (that is, the number of predetermined operations) is equal to or smaller than the fourth threshold.

In Step 51 (S51) of the write operation according to the second embodiment, the wear leveling control circuit 23 determines whether the number of command scheduled commands is equal to or smaller than the fourth threshold. Based on the determination result, the wear leveling control circuit 23 determines whether to perform the wear leveling on the predetermined page PAG of the memory cell array 11B. When the number of predetermined operations is equal to or smaller than the fourth threshold, the wear leveling control circuit 23 performs the wear leveling on the predetermined page PAG of the memory cell array 11B (YES in Step 51 (S51)). In a YES in Step 51 (S51), in Step 49 (S49), the wear leveling control circuit 23 performs the wear leveling on the predetermined page PAG of the memory cell array 11B, and the memory system 3 ends the wear leveling and the data write operation.

On the other hand, in Step 51 (S51), when the number of predetermined operations is greater than the fourth threshold, the wear leveling control circuit 23 does not perform the wear leveling on the predetermined page PAG of the memory cell array 11B. (NO in Step 51 (S51)). In a NO in Step 51 (S51), the wear leveling control circuit 23 does not perform the wear leveling on the predetermined page PAG of the memory cell array 11B, and the memory system 3 ends the data write operation.

In Step 51 (S51), the control circuit 22 or the wear leveling control circuit 23 subtracts the count value of the predetermined operation when the scheduled data write operation or the scheduled data read operation ends, and updates the count value of the predetermined operations stored in the statistical information table 33 of the memory 32 in the memory controller 2.

In the memory system 3, when the write operation and the wear leveling are performed using the information based on the operation rate of the semiconductor storage device 1, the number of the write operations is limited by two thresholds, and the number of predetermined operations on the semiconductor storage device 1 is limited. In this manner, the wear leveling can be performed on the semiconductor storage device 1. Therefore, the memory system 3 more effectively reduces a possibility that the data write operation (rewrite) on each page PAG of the semiconductor storage device 1 associated with the wear leveling may be concentrated on a specific period of time. Accordingly, it is possible to prevent the performance deterioration of the memory system.

Third Embodiment

Figure 13:
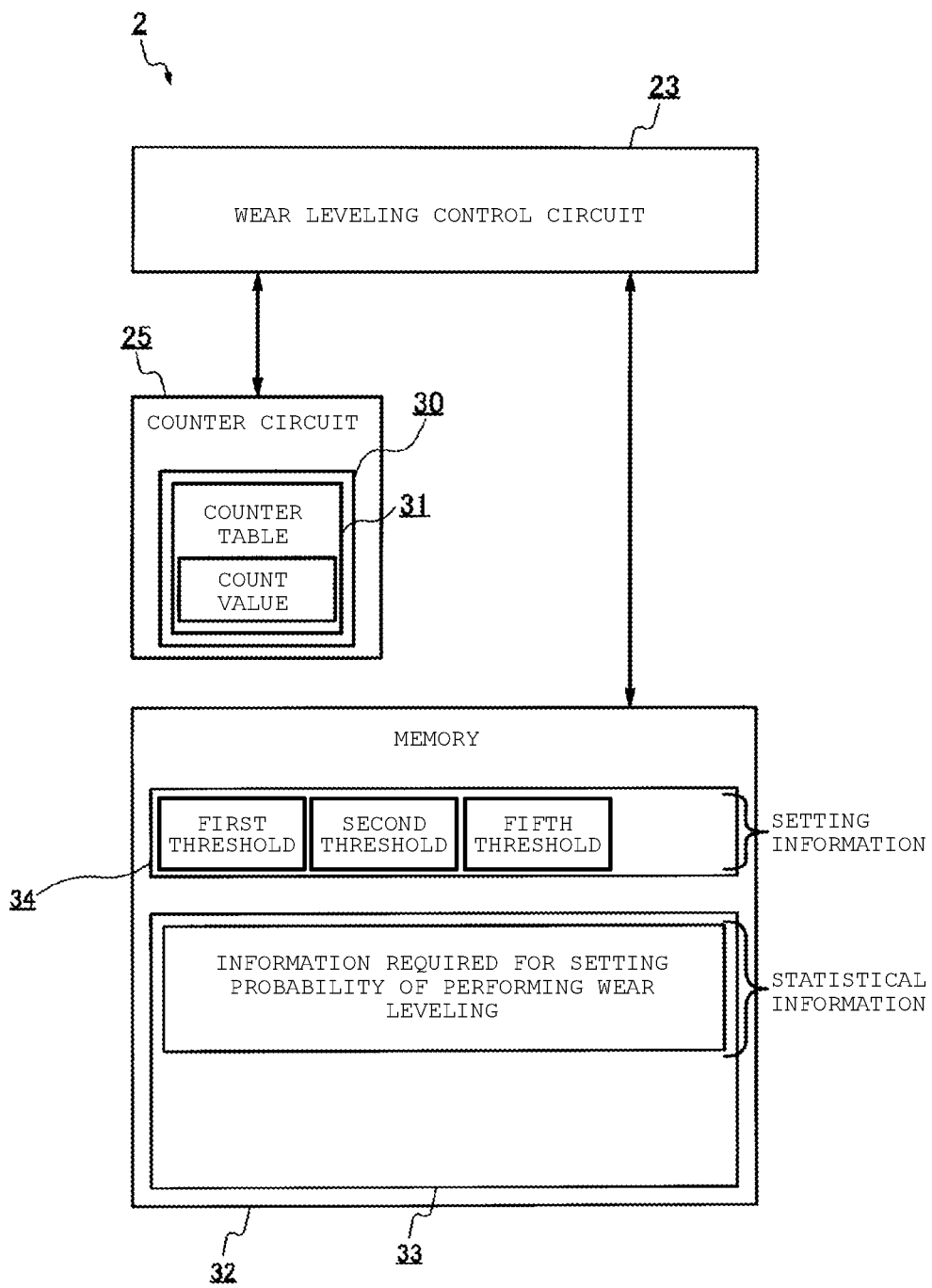
FIG. 13 depicts aspects related to an operation concerning whether to perform wear leveling in a memory system according to a third embodiment.
Figure 14:
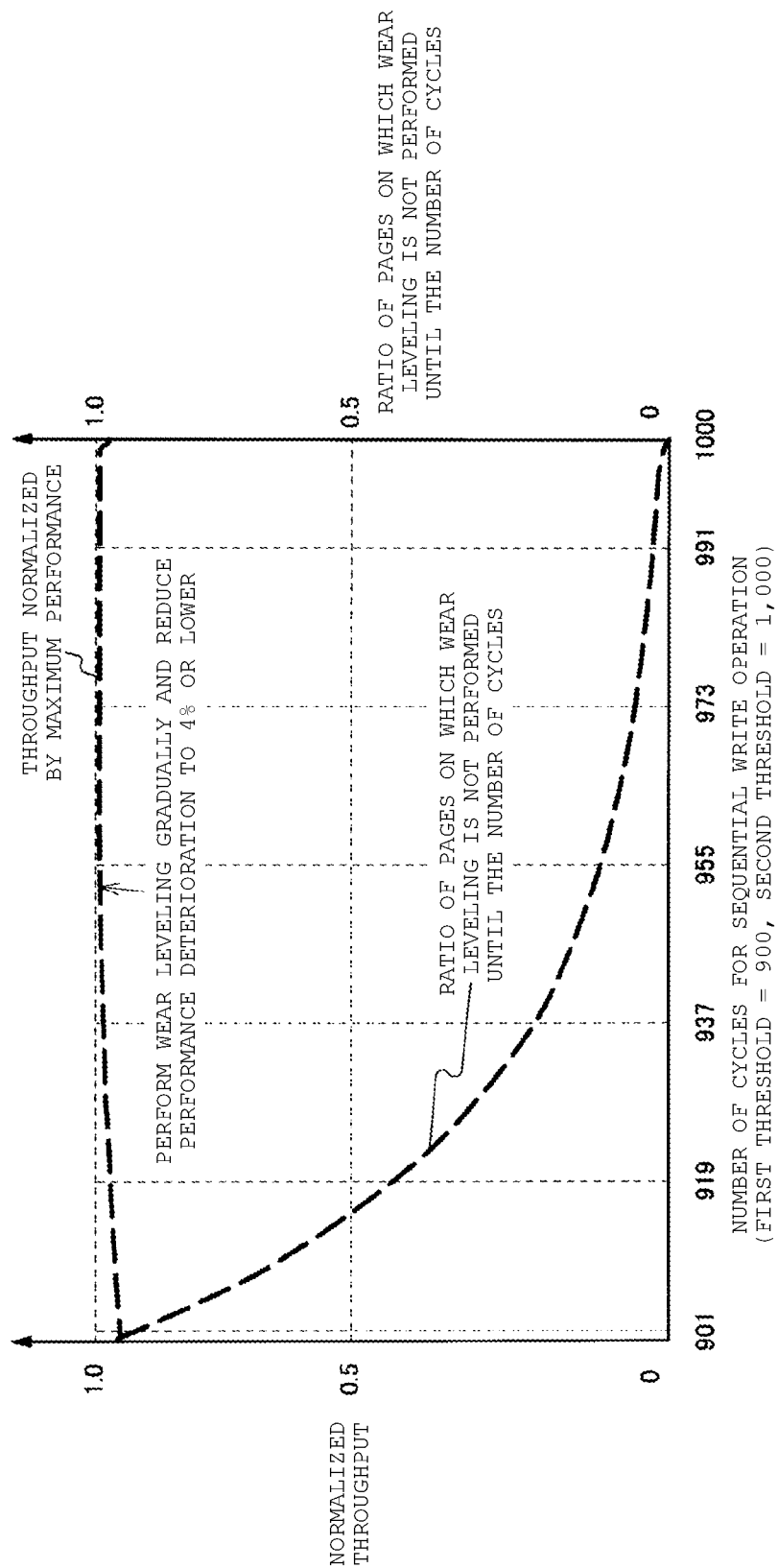
FIG. 14 depicts a graph related to throughput transition during a sequential write operation in a memory system according to a third embodiment.

The memory system 3 according to a third embodiment will be described with reference to FIGS. 1, 13, and 14. The memory system according to the third embodiment is different from the memory system according to the first embodiment and the second embodiment in the write operation. FIG. 13 depicts aspects related to an operation concerning whether to perform the write operation in the memory system 3 according to the third embodiment, and FIG. 14 depicts a graph related to throughput transition during a sequential write operation in the memory system 3 according to the third embodiment. Hereinafter, points different from those of the first embodiment and the second embodiment will mainly be described.

The write operation of the memory system 3 according to the third embodiment is different from the write operation described with reference to FIGS. 1 and 12 in the second embodiment in the following point. It is determined whether to perform the wear leveling on the predetermined page PAG of the memory cell array 11B using information required for setting a probability of performing the wear leveling in the statistical information stored in the statistical information table 33 (see FIG. 13) of the memory 32 in the memory controller 2.

In Step 51 (S51) of the write operation of the memory system 3 according to the third embodiment, when the difference is between the first threshold and the second threshold, a result of determining whether the difference is equal to or smaller than a fifth threshold is used as a condition for determining whether to perform the wear leveling on the predetermined page PAG of the memory cell array 11B.

In the write operation of the memory system 3 according to the third embodiment, the threshold to be set is different from that of the write operation described with reference to the second embodiment. In the write operation of the memory system 3 according to the third embodiment, the threshold used for calculating the probability is the fifth threshold. In the write operation of the memory system 3 according to the third embodiment, the statistical information may be any information required for setting the probability of performing the wear leveling. Specifically, as shown in FIG. 13, the statistical information includes the threshold of the wear leveling performance probability.

The information required for setting the probability of performing the wear leveling is information related to the wear leveling performance probability. For example, the information is a natural number generated using a random number generator. The threshold of the wear leveling performance probability is a threshold used for calculating the probability, and is the fifth threshold.

For example, the control circuit 22 or the wear leveling control circuit 23 has a random number generator. The control circuit 22 or the wear leveling control circuit 23 uses the random number generator to generate a natural number. In such a case, the generated natural number may be stored in the statistical information table 33 of the memory 32. The threshold of the wear leveling performance probability (referred to as a fifth threshold) may be stored in the setting information table 34 of the memory 32.

The control circuit 22 or the wear leveling control circuit 23 uses a random number generator to generate a natural number, and acquires the fifth threshold from the setting information table 34 of the memory 32. The control circuit 22 or the wear leveling control circuit 23 determines whether the generated natural number is equal to or greater than the fifth threshold.

In Step 51 (S51) of the write operation of the memory system 3 according to the third embodiment, the wear leveling control circuit 23 uses the random number generator to generate a natural number, and determines whether to perform the wear leveling on the predetermined page PAG of the memory cell array 11B. When the generated natural number is equal to or greater than the fifth threshold, the wear leveling control circuit 23 performs the wear leveling on the predetermined page PAG of the memory cell array 11B (YES in Step 51 (S51)). In a YES in Step 51 (S51), in Step 49 (S49), the wear leveling control circuit 23 performs the wear leveling on the predetermined page PAG of the memory cell array 11B, and the memory system 3 ends the wear leveling and the write operation.

On the other hand, in Step 51 (S51), when the generated natural number is smaller than the fifth threshold, the wear leveling control circuit 23 does not perform the wear leveling on the predetermined page PAG of the memory cell array 11B (NO in Step 51 (S51)). In a NO in Step 51 (S51), the wear leveling control circuit 23 does not perform the wear leveling on the predetermined page PAG of the memory cell array 11B, and the memory system 3 ends the data write operation.

The above-described process may be modified such that the wear leveling control circuit 23 determines to perform wear leveling when a randomly generated natural number is equal to or smaller than the fifth threshold. In such a case, the wear leveling control circuit 23 determines to not perform wear leveling when the generated number is greater than the fifth threshold.

With reference to FIG. 14, an example of the throughput transition during the sequential write operation of the memory system 3 according to the third embodiment will be described. In the memory system 3 according to the third embodiment, the wear leveling are performed on a particular page when the following conditions are met: (1) the number of the write operations (count value) on the page after the previous wear leveling is performed is 901 or more and 1,000 times or less (that is, the first threshold is 900, and the second threshold is 1,000), and (2) performing the wear leveling for each write request from the host device 4 with a wear leveling performance probability of 4%. In the description of the example of the throughput transition of the sequential write operation of the memory system 3 according to the third embodiment, points different from those in the example of the throughput transition of the sequential write operation of the memory system 3 according to the first embodiment will mainly be described.

As shown in FIG. 14, the horizontal axis, the left vertical axis, and the right vertical axis have parameters the same as those in FIG. 13. As shown in FIG. 14, the throughput normalized by maximum performance is 1.0. In the third embodiment, the wear leveling is performed with the wear leveling performance probability of 4% on the pages on which the wear leveling is not performed until the number of cycles, and a ratio of the pages on which the wear leveling is not performed until the number of cycles non-linearly and gradually decreases between the first threshold and the second threshold. As a result, in the example of the throughput transition of the memory system 3 during the sequential write operation according to the third embodiment, the normalized throughput is 0.96 or more, and the performance deterioration of the memory system 3 is reduced to 4% or lower.

When the memory system 3 performs the wear leveling using the information required for setting the probability of performing the wear leveling, the number of the write operations is limited by two thresholds, and the wear leveling performance probability of performing the wear leveling with respect to the number of the write operations is limited. In this manner, it is possible to shift a timing to perform the wear leveling on each page PAG with a certain probability. Therefore, since the memory system 3 is used, it is possible to prevent the performance deterioration in the write operation.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory controller connectable to a semiconductor memory having a plurality of memory areas, the memory controller comprising:
   a counter circuit configured to count a degree of wear for each of a plurality of memory areas based on a memory operation being addressed to a memory area in the plurality of memory areas; and
   a control circuit configured to:
     set a probability for wear leveling to be performed on any one of the plurality of memory areas based on a total number of memory operations performed thereon, and
     select whether to perform wear leveling on each of the memory areas based on:
       the set probability,
       the degree of wear counted for the memory area,
       a first threshold for the degree of wear, and
       a second threshold for the degree of wear, the second threshold being greater than the first threshold, wherein
   the control circuit is configured to, when selecting whether to perform wear leveling on each of the memory areas:
     determine whether the degree of wear counted for the memory area has reached the second threshold,
     upon determining that the degree of wear counted for the memory area has reached the second threshold, determine to perform the wear leveling on the memory area regardless of the set probability, and
     upon determining that the degree of wear counted for the memory area has not reached the second threshold, determine whether to perform the wear leveling on the memory area according to the set probability when the degree of wear counted for the memory area is greater than the first threshold.

2. The memory controller according to claim 1, wherein each of the memory areas is a page that is a unit for performing wear leveling.

3. The memory controller according to claim 1, wherein wear leveling is performed on each of the memory areas when the probability is equal to or less than a third threshold.

4. The memory controller according to claim 1, wherein the semiconductor memory is a phase change memory, a resistive random access memory, or a magnetoresistive random access memory.

5. The memory controller according to claim 1, wherein the memory operation is a read operation or a write operation.

6. The memory controller according to claim 1, wherein the degree of wear is counted based on at least one of read operations and write operations performed on each of the memory areas.

7. The memory controller according to claim 1, wherein the probability is calculated every time the degree of wear changes.

8. The memory controller according to claim 1, further comprising:
   a wear leveling control circuit configured to perform wear leveling on each of the memory areas when the control circuit determines to perform wear leveling on the memory area.

9. A memory system, comprising:
   a semiconductor memory including a plurality of memory areas; and
   a memory controller according to claim 1.

10. A memory controller connectable to a semiconductor memory including a plurality of memory areas, the memory controller comprising:
    a counter circuit configured to count a degree of wear for each of a plurality of memory areas based on a memory operation being addressed to a memory area in the plurality of memory areas; and
    a control circuit configured to:
      determine a number of scheduled commands to be performed on each of the plurality of memory areas, and
      select whether to perform wear leveling on said each of the memory areas based on:
        the determined number of scheduled commands,
        the degree of wear counted for the memory area,
        a first threshold for the degree of wear, and
        a second threshold for the degree of wear, which is greater than the first threshold, wherein
    the control circuit is configured to, when selecting whether to perform wear leveling on each of the memory areas:
      determine whether the degree of wear counted for the memory area has reached the second threshold,
      upon determining that the degree of wear counted for the memory area has reached the second threshold, determine to perform the wear leveling on the memory area regardless of the determined number of scheduled commands, and
      upon determining that the degree of wear counted for the memory area has not reached the second threshold, determine whether to perform the wear leveling on the memory area according to the determined number of scheduled commands when the degree of wear counted for the memory area is greater than the first threshold.

11. The memory controller according to claim 10, wherein each of the memory areas is a page that is a unit for performing wear leveling.

12. The memory controller according to claim 10, wherein the wear leveling is performed on the memory areas only when the determined number of scheduled commands is equal to or less than a fourth threshold.

13. A memory system, comprising:
a semiconductor memory including a plurality of memory areas; and
a memory controller according to claim 10.

14. A memory controller connectable to a semiconductor memory including a plurality of memory areas, the memory controller comprising:
a counter circuit configured to count a degree of wear for each of a plurality of memory areas based on a memory operation being addressed to a memory area in the plurality of memory areas; and
a control circuit configured to:
acquire a randomly generated number, and
select whether to perform wear leveling on each of the memory areas based on:
the randomly generated number,
the degree of wear counted for the memory area,
a first threshold for the degree of wear, and
a second threshold for the degree of wear, which is greater than the first threshold, wherein
the control circuit is configured to, when selecting whether to perform wear leveling on each of the memory areas:
determine whether the degree of wear counted for the memory area has reached the second threshold,
upon determining that the degree of wear counted for the memory area has reached the second threshold, determine to perform the wear leveling on the memory area regardless of the randomly generated number, and
upon determining that the degree of wear counted for the memory area has not reached the second threshold, determine whether to perform the wear leveling on the memory area according to the randomly generated number when the degree of wear counted for the memory area is greater than the first threshold.

15. The memory controller according to claim 14, wherein each of the memory areas is a page that is a unit for performing wear leveling.

16. The memory controller according to claim 14, wherein the wear leveling is performed only when the randomly generated number is equal to or less than a fifth threshold.

17. The memory controller according to claim 15, wherein the wear leveling is performed only when the randomly generated number is equal to or greater than a fifth threshold.

* * * * *